United States Patent
Kyou et al.

(10) Patent No.: US 10,484,293 B2
(45) Date of Patent: Nov. 19, 2019

(54) COMMUNICATION DEVICE, COMMUNICATION METHOD, AND STORAGE MEDIUM

(71) Applicant: CASIO COMPUTER CO., LTD., Shibuya-ku, Tokyo (JP)

(72) Inventors: Kazuho Kyou, Hamura (JP); Makoto Nakagawa, Hamura (JP); Hiroshi Iwamiya, Hamura (JP); Tsutomu Terazaki, Hamura (JP); Takahiro Tomida, Hamura (JP); Ryo Okumura, Hamura (JP); Toshihiro Takahashi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/914,014

(22) Filed: Mar. 7, 2018

(65) Prior Publication Data

US 2018/0278535 A1    Sep. 27, 2018

(30) Foreign Application Priority Data

Mar. 27, 2017 (JP) ................... 2017-061328

(51) Int. Cl.
| | |
|---|---|
| *H04L 12/805* | (2013.01) |
| *H04W 28/06* | (2009.01) |
| *H04W 4/80* | (2018.01) |
| *G04G 21/04* | (2013.01) |
| *H04W 24/02* | (2009.01) |

(52) U.S. Cl.
CPC ............ *H04L 47/36* (2013.01); *G04G 21/04* (2013.01); *H04W 4/80* (2018.02); *H04W 24/02* (2013.01); *H04W 28/06* (2013.01); *Y02D 70/00* (2018.01); *Y02D 70/1262* (2018.01); *Y02D 70/144* (2018.01); *Y02D 70/20* (2018.01); *Y02D 70/26* (2018.01)

(58) Field of Classification Search
CPC ........ H04L 47/36; H04L 12/805; H04W 4/80; H04W 28/06; H04W 24/02; G04G 21/04; Y02D 70/20; Y02D 70/1262; Y02D 70/144; Y02D 70/26; Y02D 70/00
USPC ........................................................ 370/389
See application file for complete search history.

(56) References Cited

U.S. PATENT DOCUMENTS

| | | | | |
|---|---|---|---|---|
| 7,349,396 | B2 * | 3/2008 | Ohta ................... | H04L 29/06 370/392 |
| 7,738,495 | B2 * | 6/2010 | Dalal ................... | H04L 47/365 370/300 |
| 8,780,734 | B2 * | 7/2014 | Kwag .................. | H04W 28/06 370/233 |

(Continued)

FOREIGN PATENT DOCUMENTS

JP    2014-175830    9/2014

*Primary Examiner* — Man U Phan
(74) *Attorney, Agent, or Firm* — Amin, Turocy & Watson LLP

(57) ABSTRACT

According to an aspect of the present invention, a device includes a transmitter and receiver that transmits and receives communication packets to and from other device, and a processor. The processor receives a packet containing first information indicating a structure type of data from the other device via the transmitter and receiver and communicates data corresponding to the first information with the other device via the transmitter and receiver.

14 Claims, 21 Drawing Sheets

(56) References Cited

U.S. PATENT DOCUMENTS

| | | | |
|---|---|---|---|
| 10,108,379 B2* | 10/2018 | Kimura | G06F 3/1205 |
| 10,142,767 B2* | 11/2018 | Kwon | H04L 1/00 |
| 10,169,024 B2* | 1/2019 | Hillyard | G06F 8/654 |
| 2012/0063449 A1* | 3/2012 | Frederic | H04L 69/166 |
| | | | 370/389 |
| 2013/0189925 A1* | 7/2013 | Staskawicz | H04B 7/24 |
| | | | 455/41.1 |
| 2017/0214664 A1* | 7/2017 | Birgisson | H04L 9/0869 |
| 2017/0286943 A1* | 10/2017 | Glashan | G06Q 20/327 |
| 2018/0184270 A1* | 6/2018 | Chun | H04W 92/10 |

\* cited by examiner

| Type of Advertising Packet | PDU Type | Connectable | Scannable | Directed | Min. Value of Ti |
|---|---|---|---|---|---|
| ADV_IND | 0000 | O | O | X | 20ms |
| ADV_DIRECT_IND | 0001 | O | X | O | 20ms |
| ADV_NONCONN_IND | 0010 | X | X | X | 100ms |
| ADV_SCAN_IND | 0110 | X | O | X | 100ms |

FIG. 3

| Handle | Attribute Type | Attribute Value |
|---|---|---|
| 0x0010 | <<Primary Service>> | <<Watch Feature Service>> |
| 0x0011 | <<Characteristics>> | <<ServiceN1>> |
| 0x0012 | <<ServiceN1>> | (ServiceN1 value) |
| 0x0013 | <<Characteristics>> | <<ServiceN2>> |
| 0x0014 | <<ServiceN2>> | (ServiceN2 value) |
| ... | ... | ... |
| 0x0030 | <<Characteristics>> | <<ServiceNx>> |
| 0x0031 | <<ServiceNx>> | (ServiceNx value) |

FIG. 5

| Handle | Attribute Type | Attribute Value |
|---|---|---|
| 0x0010 | <<Primary Service>> | <<Watch Feature Service>> |
| 0x0011 | <<Characteristics>> | <<Updated ATT_MTU>> |
| 0x0012 | <<Updated ATT_MTU>> | (Updated ATT_MTU) |
| 0x0013 | <<CCCD>> | |
| 0x0014 | <<Characteristics>> | <<Request Command for Features>> |
| 0x0015 | <<Request Command for Features>> | |
| 0x0016 | <<Characteristics>> | <<Watch Features>> |
| 0x0017 | <<Watch Features>> | (Service values) |

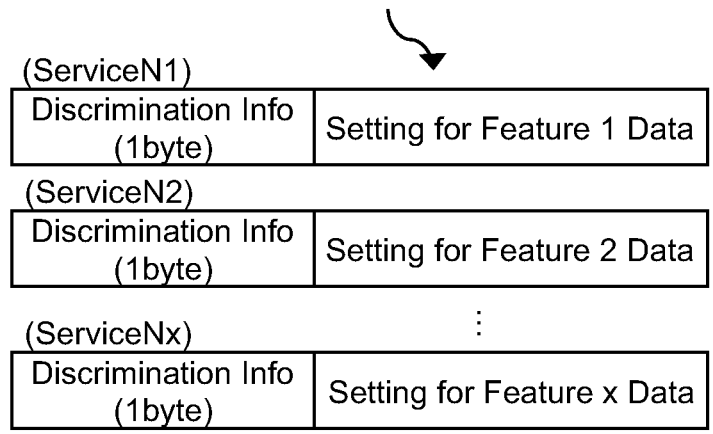

(ServiceN1)

| Discrimination Info (1byte) | Setting for Feature 1 Data |
|---|---|

(ServiceN2)

| Discrimination Info (1byte) | Setting for Feature 2 Data |
|---|---|

(ServiceNx)

| Discrimination Info (1byte) | Setting for Feature x Data |
|---|---|

FIG. 7

| Kind of Data | Value of Distinguishing Information (1 byte) |
|---|---|
| Setting for Feature 1 | 0x00 |
| Setting for Feature 2 | 0x01 |
| Setting for Feature 3 | 0x02 |
| Setting for Feature 4 | 0x03 |
| ⋮ | ⋮ |
| Setting for Feature N | $(N-1)_{16}$ |

FIG. 8

| Command Type | Command Data |
|---|---|

FIG. 10

| Command Type | Value (1 byte) |
|---|---|
| Transmission Instruction | 0x00 |
| Write Waiting Instruction | 0x01 |

FIG. 11

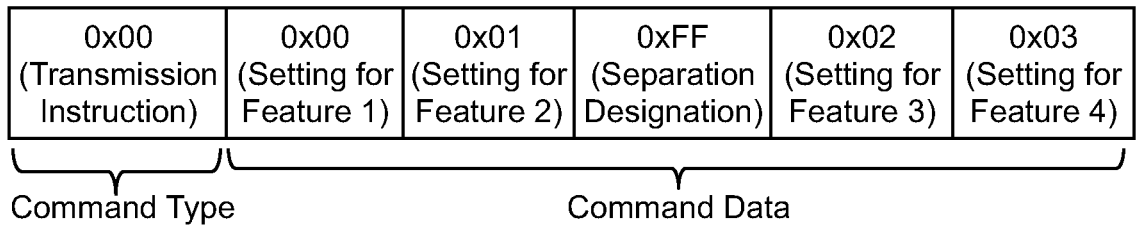
FIG. 12A
Handle Value Notification 1
Handle Value Notification 2
FIG. 12B

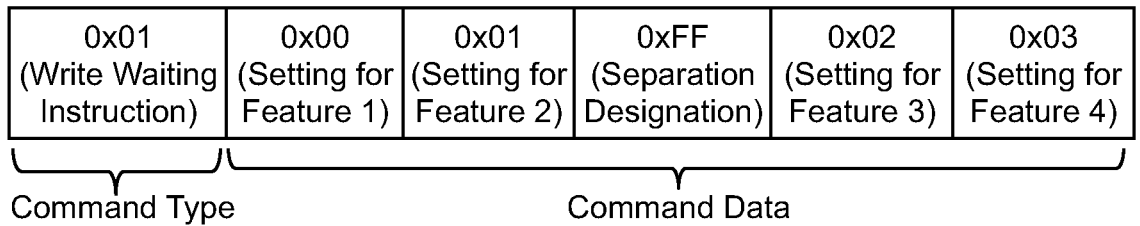
FIG. 14A
Write Command 1
Write Command 2
FIG. 14B

| Handle | Attribute Type | Attribute Value |
|---|---|---|
| 0x0010 | <<Primary Service>> | <<Watch Feature Service>> |
| 0x0011 | <<Characteristics>> | <<Updated ATT_MTU>> |
| 0x0012 | <<Updated ATT_MTU>> | (Updated ATT_MTU) |
| 0x0013 | <<CCCD>> | |
| 0x0014 | <<Characteristics>> | <<Read Command for Features>> |
| 0x0015 | <<Read Command for Features>> | |
| 0x0016 | <<Characteristics>> | <<Write Command for Features>> |
| 0x0017 | <<Write Command for Features>> | |
| 0x0018 | <<Characteristics>> | <<Watch Features>> |
| 0x0019 | <<Watch Features>> | (Service values) |

(ServiceN1)

| Discrimination Info (1byte) | Setting for Feature 1 Data |
|---|---|

(ServiceN2)

| Discrimination Info (1byte) | Setting for Feature 2 Data |
|---|---|

(ServiceNx)

| Discrimination Info (1byte) | Setting for Feature x Data |
|---|---|

FIG. 21

COMMUNICATION DEVICE, COMMUNICATION METHOD, AND STORAGE MEDIUM

CROSS-REFERENCE TO RELATED APPLICATIONS

This application is based upon and claims the benefit of priority under 35 USC 119 of Japanese Patent Application No. 2017-061328 filed on Mar. 27, 2017, the entire disclosure of which is incorporated herein by reference in its entirety for all purposes.

BACKGROUND OF THE INVENTION

1. Field of the Invention

The present invention relates to a communication device, a communication method, and a computer readable storage medium for storing a program for executing the communication method therein.

2. Description of the Related Art

Conventionally, there exist electronic devices capable of exchanging various kinds of information with other devices using a short-distance wireless communication protocol such as Bluetooth (Registered Trademark). Bluetooth is a communication standard for connecting various devices and exchanging data between the devices wirelessly over short distances. There are two types of Bluetooth communication technologies: BR/EDR (Basic Rate/Enhanced Data Rate) and LE (Low Energy). BR/EDR is also referred to as Bluetooth Classic. Bluetooth Low Energy (hereinafter, referred to as "BLE") adopted in Bluetooth 4.0 and later versions is a technology enabling several hundreds of kilobytes (KBs) of information to be stably communicated with low power consumption. This BLE technology reduces energy consumption by simplifying operations compared to Bluetooth Classic. Most wearable wireless communication devices such as smart bands, smart watches, and smart glasses, which have been recently launched, perform wireless communication using BLE.

By such short-distance wireless communication, information acquired or held by each of a plurality of electronic devices can be easily acquired by other electronic devices. For example, Japanese Patent Application Laid-Open Publication No. 2014-175830 published on Sep. 22, 2014, discloses a technology for exchanging the value of Maximum Transmission Unit (MTU) between two communication devices and allocating communication time according to the value of the MTU.

However, the technology disclosed in the above patent document does not consider the kinds of information to be transmitted and received. Thus, in the case of communicating a plurality kinds of information, the number of communications between the communication devices increases according to the number of kinds of information to be communicated. Therefore, if the number of kinds of information to be communicated is large, current consumption and processing load of the communication devices increase.

SUMMARY OF THE INVENTION

The present specification discloses communication methods between wireless communication devices, communication devices for executing the methods, and computer readable storage mediums for storing programs capable of executing the methods therein.

According to one aspect of the invention, a device includes a transmitter and receiver that transmits and receives communication packets to and from other device, and a processor. The processor receives a packet containing first information indicating a structure type of data from the other device via the transmitter and receiver and communicates data corresponding to the first information with the other device via the transmitter and receiver.

According to another aspect of the invention, a device includes a transmitter and receiver that transmits and receives communication packets to and from other device, and a processor. The processor determines a structure type of one or more kinds of data to be communicated with the other device based on a data size which can be communicated per unit communication of the other device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention.

Here:

FIG. 3 is a table for explaining the types of advertising packets.

FIG. 5 shows an example of a typical Attribute Database.

FIG. 7 shows an example of an Attribute Database according to an embodiment of the present invention.

FIG. 8 shows an example of a list of distinguishing information.

FIG. 10 shows a format of Attribute Value of an instruction command according to an embodiment of the present invention.

FIG. 11 shows an example of a command type according to an embodiment of the present invention.

FIG. 12A shows an example of Attribute Value of an instruction command for transmission instruction according to an embodiment of the present invention.

FIG. 12B shows an example of Attribute Value of Notification messages for carrying setting data according to an embodiment of the present invention.

FIG. 14A shows an example of Attribute Value of an instruction command for write waiting instruction according to an embodiment of the present invention.

FIG. 14B shows an example of Attribute Value of Write Command messages according to an embodiment of the present invention.

FIG. 21 shows an example of Attribute Database according to an embodiment of the present invention.

DETAILED DESCRIPTION OF THE PREFERRED EMBODIMENT

In the present specification, the invention will be mainly described in connection with embodiments which employ Bluetooth, in particular, BLE, but without limitation to the foregoing. The embodiments are applicable to all communication schemes requiring services and characteristics.

Hereinafter, embodiments of the present invention will be described with reference to the accompanying drawings. The scope of the invention is not intended to be limited to the illustrated examples.

Figure 1:
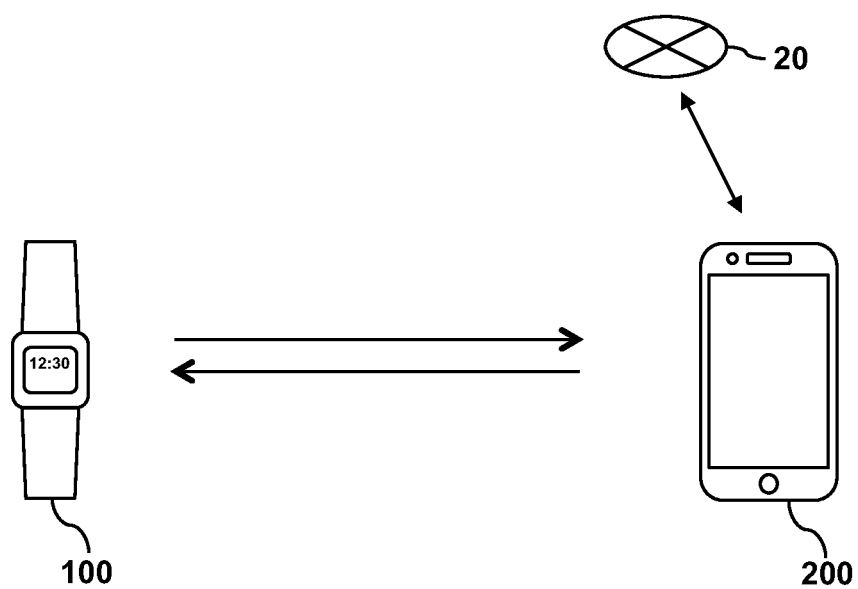
FIG. 1 shows an example of a wireless communication system to which methods proposed in this disclosure are applicable.

FIG. 1 is common to all of the embodiments in the following and shows an example of a wireless communication system to which methods proposed in this disclosure are applicable. In the embodiments described below, a first device and a second device perform short-distance wireless communication using the BLE technology. A wireless communication system 10 includes at least a first device 100 and a second device 200 capable of being wirelessly connected to and exchanging data with the first device 100 via BLE. For example, the first device 100 to which preferable embodiments of the present invention are applicable is an electronic timepiece which is a kind of a watch type terminal. However, the first device 100 is not limited to this example and any type or any kind of device capable of BLE communication can be the first device 100. For example, the first device 100 may be a digital camera, a healthcare appliance such as a digital body weight scale, or a wearable device such as a smart band.

The second device 200 to which preferable embodiments of the present invention are applicable is, for example, a smart phone which is a kind of a mobile phone and is connected to a mobile communication network 20. However, the second device 200 is not limited to this example and any type or any kind of device capable of short distance wireless communication can be the second device 200.

As will be described later, Attribute Protocol (ATT) of BLE defines rules for one device to access data of the other device in a server-client structure. A server provides a service and a client can acquire information relating to the service provided by the server by sending a request to the server. Hereinafter, for convenience of explanation, the first device 100 is regarded as the server and an application of the second device 200 is regarded as the client, unless otherwise specified. However, the first device 100 may operate as the client in relation to other device(s) and the second device 200 may operate as the server in relation to other device(s). In a BLE communication system, one device belonging to the system may operate as the server or the client or as the client and server at the same time.

The second device 200 can request data from the first device 100. In the case of receiving a Request message for requesting data from the second device 200, the first device 100 provides the second device 200 with the requested data by a Response message. Further, the first device 100 transmits a Notification message or an Indication message to send data to the second device 200. In the case that the first device 100 transmits the Indication message to the second device 200 and the Indication message is received by the second device 200, the second device 200 transmits a Confirmation message to the first device 100 in response to the Indication message. In addition, the second device 200 transmits a Request message or a Command message to the first device 100 to request the first device 100 to write data. In the case that the second device 200 transmits the Request message to the first device 100 and the data is written by the first device 100, the first device 100 transmits a Response message to the second device 200.

The first device 100 or the second device 200 can provide a user with information data via an output unit (for example, a display) or receive a request of the user input via an input unit (for example, a user input interface) during communicating a message with the other device. Further, the first device 100 or the second device 200 can read data from a memory or write new data to the memory.

Figure 2A:
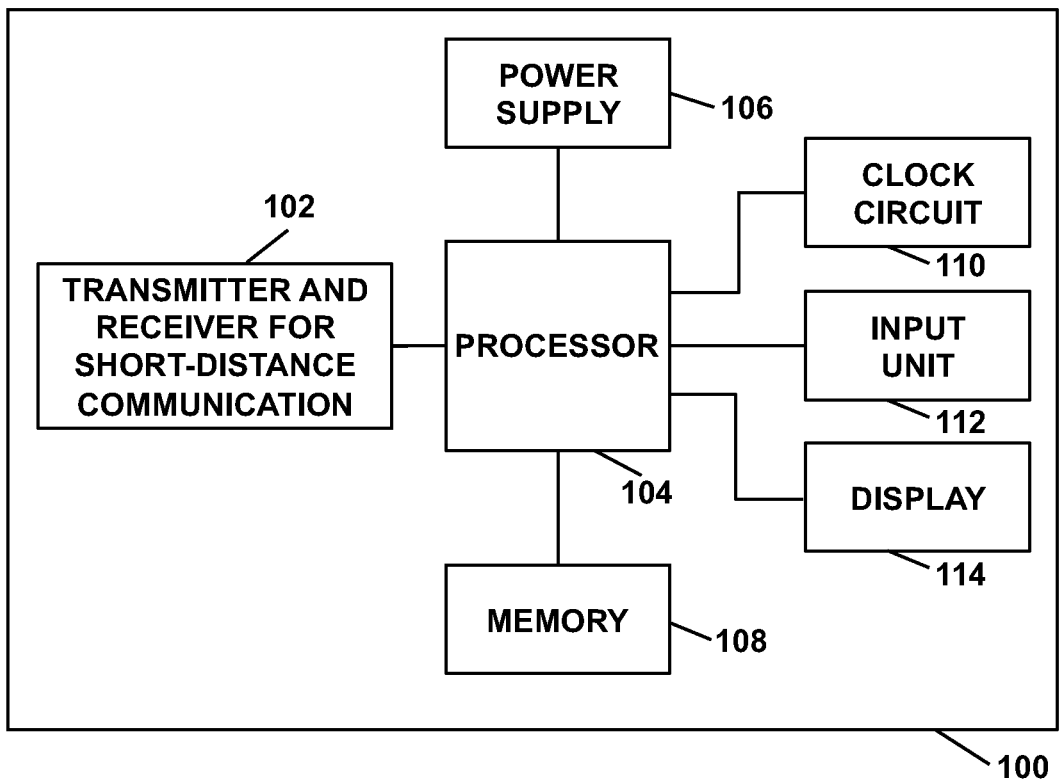
FIG. 2A is an internal block diagram illustrating an exemplary device capable of implementing the methods proposed in this disclosure.
Figure 2B:
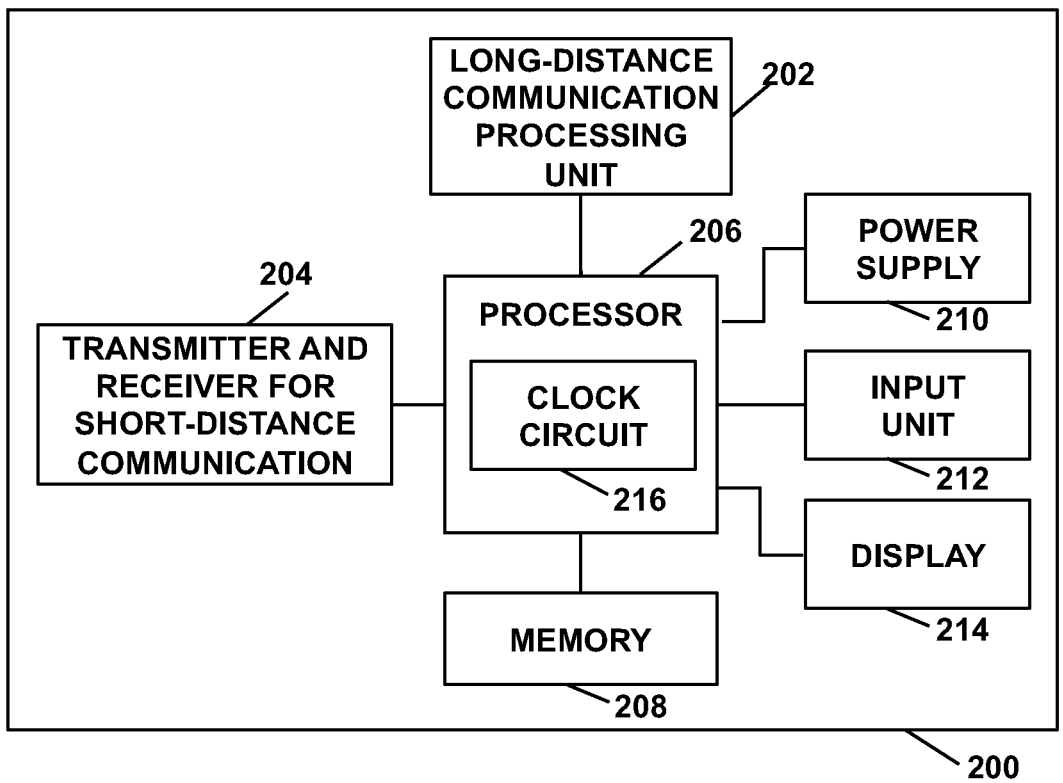
FIG. 2B is an internal block diagram illustrating an exemplary device capable of implementing the methods proposed in this disclosure.

Each of FIGS. 2A and 2B is an internal block diagram of an exemplary device capable of implementing the methods proposed in this disclosure. FIG. 2A is an internal block diagram of the first device 100 and FIG. 2B is an internal block diagram of the second device 200.

As shown in FIG. 2A, the first device 100 includes a transmitter and receiver for short-distance communication 102, a processor 104, a power supply 106, a memory 108, a clock circuit 110, an input unit 112, and a display 114. The transmitter and receiver for short-distance communication 102 includes an interface enabling transmission/reception of the Request/Response, Command, Notification, Indication/Confirmation messages or other packets between the devices using the short-distance wireless communication technology (for example, Bluetooth) and a baseband circuit for processing wireless signals. In the present embodiment, the transmitter and receiver for short-distance communication 102 supports BLE. At least one of functions of the transmitter and receiver for short-distance communication 102 can be implemented by software. In this case, the software implementing the at least one function can be stored in the memory 108 in the form of a program executing the at least one function.

The processor 104 controls operations of the first device 100 and may also be referred to as a processing unit, a control unit, or a controller. The processor 104 may include an ASIC (application-specific integrated circuit), different chipsets, a logic circuit and/or a data processing unit. The power supply 106 includes a battery and a power management unit (not shown in the drawing). The memory 108 is used to store computer program instructions executed by the processor 104, software such as firmware, data required by the processor 104, and/or data resulted from processing by the processor 104. The memory 108 includes one or more storage devices selected from a group including a RAM (Random Access Memory), a ROM (Read Only Memory), a flash memory, and a disk drive integrated into or removable from the first device 100. Alternatively, the memory 108 may be integrated into the processor 104.

The clock circuit 110 includes a counter for generating time signals, for example, from signals generated by a system clock or an oscillator (not shown in the drawing). The clock circuit 110 generates time information by counting current date and time and outputs the generated time information to the processor 104. The clock circuit 110 may be integrated into the processor 104. The input unit 112 includes one or more keys, one or more switches, and/or a touch panel (not shown in the drawing). Various kinds of data are input according to manipulations of the input unit 112 by the user. The display 114 includes a display device such as an LCD or an OLED and a driving circuit (not shown in the drawing) and displays information such as the current time.

The first device 100 normally displays the current time, which is being counted by the clock circuit 110, using the display 114. In the case that the first device 100 receives data indicating current time from the second device 200 via the transmitter and receiver for short-distance communication 102, time of the first device 100 is synchronized with that of the second device 200 by setting the clock circuit 110 to the time indicated by the received data.

As shown in FIG. 2B, the second device 200 includes a long-distance communication processing unit 202, a transmitter and receiver for short-distance communication 204, a processor 206, a memory 208, a power supply 210, an input unit 212, and a display 214. The processor 206 includes a clock circuit 216. The long-distance communication processing unit 202 allows the second device 200 to serve as a mobile phone by communicating with a base station of a cellular network system such as 3G or LTE. The long-distance communication processing unit 202 includes an amplifier for amplifying signals received or transmitted via an antenna, a transceiver, a digital baseband processor, a voice input circuit, or a playback circuit, but descriptions and drawings of these components are omitted because they are well-known. The clock circuit 216 can hold accurate time information by acquiring accurate time data via the long-distance communication processing unit 202 from the mobile communication network 20. As described above, the second device 200 can transfer the time information held by the clock circuit 216 to the first device 100.

The transmitter and receiver for short-distance communication 204 includes an interface enabling transmission/reception of the Request/Response, Command, Notification, Indication/Confirmation messages or other packets between the devices using the short-distance wireless communication technology (for example, Bluetooth) and a baseband circuit for processing radio signals. In the present embodiment, the transmitter and receiver for short-distance communication 204 supports BLE. At least one of functions of the short distance communicator 204 can be implemented by software. In this case, the software implementing the at least one function can be stored in the memory 208 in the form of a program executing the at least one function.

The processor 206 controls operations of the second device 200 and is an application processor, for example. While the processor 206 includes the clock circuit 216 in the present embodiment, the clock circuit 216 may be a separate element in different embodiments. The memory 208 is used to store computer program instructions executed by the processor 206, software such as firmware, data required by the processor 206, and/or data resulted from processing by the processor 206. The memory 208 includes one or more storage devices selected from a group including a RAM (Random Access Memory), a ROM (Read Only Memory), a flash memory, and a disk drive integrated into or removable from the second device 200. Alternatively, the memory 208 may be integrated into the processor 206.

The power supply 210 includes a battery and a power management unit (not shown in the drawing). The input unit 212 includes one or more keys, one or more switches, and/or a touch panel (not shown in the drawing). Various kinds of data are input according to manipulations of the input unit 212 by the user. The display 214 includes a display device such as an LCD or an OLED and a driving circuit (not shown in the drawing).

The system shown in FIG. 1, and the devices shown in FIGS. 2A and 2B, respectively, are merely examples and do not limit the scope of systems or devices capable of implementing the methods described herein.

The ATT protocol defines rules for one device to access data of the other device in the server-client structure. The ATT protocol defines six (6) types of messages (Request, Response, Command, Notification, Indication, and Confirmation), as follows:

(1) Request and Response messages: The Request message is transmitted to the server by the client to request specific information. The Response message is transmitted from the server to the client to reply to the Request message.

(2) Command message: The Command message is transmitted to the server by the client to request the server to take a specific action. The server sends no response to the Command message to the client.

(3) Notification message: The Notification message is transmitted to the client by the server to notify the client of an event or the like. The client sends no confirmation in response to the Notification message to the server.

(4) Indication and Confirmation messages: The Indication message is transmitted to the client by the server to notify the client of an event or the like. Unlike the Notification message, the client sends the Confirmation message to the server in response to the Indication message.

Generic Attribute Profile (GATT) is operable as a protocol for describing how the ATT protocol is used at the time of configuring a service. The GATT profile provides another device with specific data (i.e. Attribute) using the concept of Service and Characteristic. The GATT profile defines two roles, i.e. a server and a client. A device which provides the Attribute is a GATT server (hereinafter, the "server") and a device to which the Attribute is provided is a GATT client (hereinafter, the "client").

A service is any entity that can provide information, perform an action, or control a resource on behalf of another entity. The service may be implemented as software, hardware, or a combination of hardware and software. All of the information about the service that is maintained by an SDP server is contained within a single service record. Services are used to break data up into logic entities, and contain specific chunks of data called characteristics. Each service can have one or more characteristics, and distinguishes itself from other services by means of a unique ID called a UUID (Universal Unique Identifier).

A characteristic is a data array used in the service and each characteristic has its UUID. Each characteristic contains two Attributes: a Characteristic Declaration and a Characteristic Value Declaration. The Characteristic Declaration is an Attribute with Attribute Type (UUID) and Attribute Value, and the Attribute Value contains Characteristic Properties, Characteristic Value Handle, and Characteristic UUID. The Characteristic Value Declaration contains UUID for Characteristic Value and the Characteristic Value.

FIG. 3 is a table for explaining the types of advertising packets. As shown in FIG. 3, there are four types of advertising packets used for Bluetooth communication. A value set in a PDU Type field of a PDU header of a packet indicates the type of the packet. ADV_IND is used in connectable undirected advertising events. The connectable undirected advertising event type allows simple information inquiry (that is, scannable). The simple information inquiry means a procedure in which the device performing scanning (referred to as a "scanner") transmits to the device performing advertising ("advertiser") the scan request (SCAN_REQ PDU) to request additional information about the advertiser (for example, device information or services provided by the advertiser) before connection. ADV_DIRECT_IND is used in connectable directed advertising events. ADV_DIRECT_IND has no data part in which advertising data can be stored. Therefore, in the case that the advertiser's data is required to be transmitted by advertisement, ADV_DIRECT_IND cannot be used. ADV_NONCONN_IND is used in non-connectable undirected advertising events. ADV_SCAN_IND is used in scannable undirected advertising events. The scannable undirected advertising event type allows the simple information inquiry (that is, only the simple information inquiry is possible for any device).

Figure 4A:
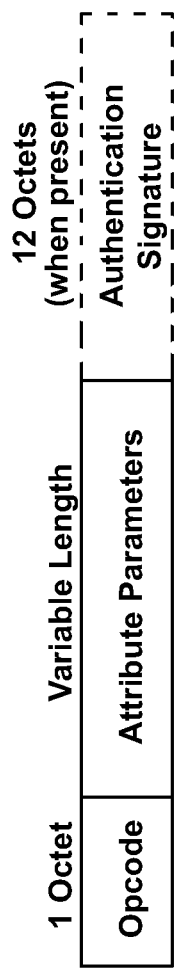
FIG. 4A shows a typical structure of an Attribute Protocol PDU which can be used to communicate an attribute value.

FIG. 4A shows a typical structure of an Attribute Protocol PDU which can be used to communicate an attribute value. The GATT profile uses the Attribute Protocol to transport data in the form of commands, requests, responses, notifications, indications, or confirmations between devices. The data is contained in the Attribute Protocol PDU having the structure shown in FIG. 4A. The Attribute Protocol PDU may include an Attribute Opcode field, an Attribute Parameters field, and an Authentication Signature field (optional). The Authentication Signature field is an optional field and selectively exists or does not exist.

The Attribute Opcode is data of one (1) octet and includes information indicating what kind of PDU the Attribute protocol PDU is. The Attribute parameters include actual information to be transported in a message and may have the following values:

Handle: Reference information corresponding to data (or an index). By using the handle, the GATT client may refer to, access, or change a value.
Value: A value of data.
Data List: A list of multiple values of data.
Length: A length of data.

By using the Attribute protocol PDU as described above, the client can read the value(s) of Attribute Handle, Attribute Value, Data List, or Length stored in the server, or can store the value(s) in the server.

Figure 4B:
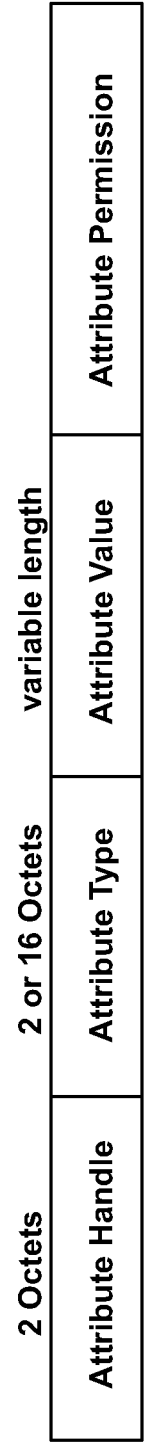
FIG. 4B shows an example of a typical structure of an Attribute stored in a GATT server.

Attribute Protocol commands and requests access values stored as Attributes in the server device. FIG. 4B shows a typical structure of the Attribute stored in the server. The server uses such Attributes to provide services. Each Attribute contains four parts and each part has the following meaning:

Attribute Handle: An identifier (or an index) corresponding to a specific Attribute.
Attribute Type: A type of the Attribute (a UUID describing the Attribute Value).
Attribute Value: A value of the Attribute (data indexed by the handle).
Attribute Permission: Permission associated with the attribute specifying that it may be read and/or written.

FIG. 5 shows an example of a typical Attribute Database. The BLE device in which the Attribute Database shown in FIG. 5 is implemented is, for example, an electronic timepiece. Each service is used to logically break up data and includes one or more characteristics. As shown, Watch Feature Service, which is a primary service, includes a plurality of characteristics (ServiceN1, ServiceN2, . . . , ServiceNx). In this example, the service Watch Feature Service includes x characteristics. As shown in the drawing, the Attribute Database is configured to have one characteristic for one feature in the conventional BLE device. Each service or each characteristic has a UUID, that is, a 16-bit or 128-bit identifier. The Bluetooth Standard Group provides an official list of services and characteristics as Specification of the Bluetooth System.

As described above, each characteristic contains two Attributes, i.e. the Characteristic Declaration and the Characteristic Value Declaration. For example, the Characteristic Declaration of ServiceN1 contains Attribute Type (a UUID of Characteristics, specifically 0x2803) and Attribute Value which contains Characteristic Properties (0x0a), Characteristic Value Handle (0x0012), and Characteristic UUID (a UUID of ServiceN1). The Characteristic Value declaration of ServiceN1 contains a UUID for Characteristic Value (the UUID of ServiceN1) and the Characteristic Value (a value of ServiceN1). The Characteristic Value is a setting value of the corresponding feature.

Figure 6:
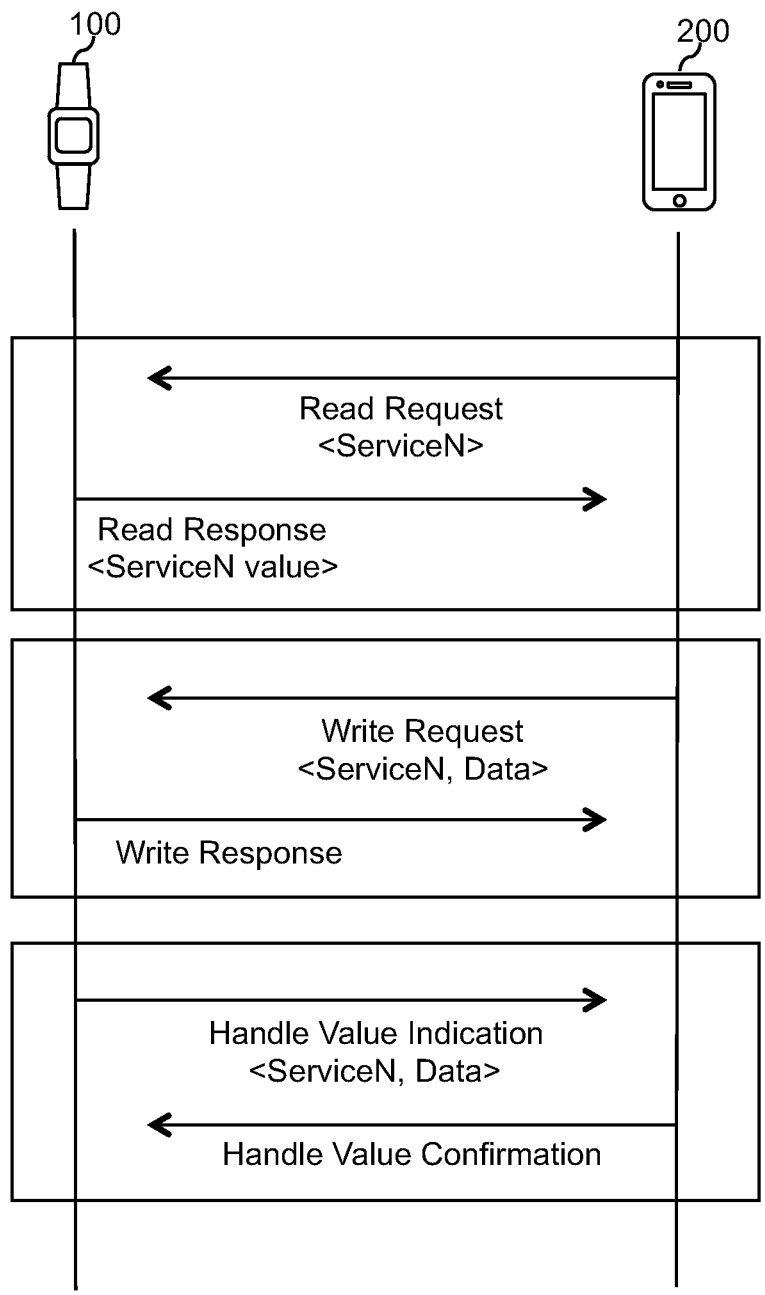
FIG. 6 shows a conventional method for exchanging data between a server and a client by BLE communication.

Once a connection between the server and the client is established, both devices can perform data communication, and the client can access a specific service provided by the server. For example, FIG. 6 shows a conventional method for exchanging data between the server and the client by BLE communication. In the example shown in the drawing, the first device 100 operates as the server and the second device 200 operates as the client. The Attribute Database shown in FIG. 5 is implemented in the first device 100. In the case of requesting to the server for a specific Characteristic Value, the client transmits a Read Request to the server. The Read Request is used to request the server to read the value of an attribute and return its value as defined in the BLE Specification and uses the Attribute Handle as its parameter. In this case, an Attribute Handle parameter of the Read Request is set to the Characteristic Value Handle.

In the case that the Read Request from the client is valid, i.e. the client has the authority to request the data and the server can read the requested data, the server transmits the data to the client by a Read Response. The Read Response is sent in reply to the received Read Request by the server and contains the value of the attribute that has been read as defined in the BLE Specification. The Read Response uses the Attribute Value as its parameter. In this case, the value transported by the Read Response is the Characteristic Value corresponding to the Characteristic Value Handle.

For example, in the case of requesting the value of ServiceN1, the client transmits a Read Request with the Attribute Handle Parameter set to 0x0012 to the server. In response to the Read Request, the server transmits a Read Response with the Attribute Value Parameter set to the ServiceN1 value.

In the case that the client wants to request the server to write data, it transmits a Write Request with an Attribute Handle parameter and an Attribute Value parameter set to the Characteristic Value Handle of the Characteristic Value (i.e. the data to be written) and the data, respectively. The Write Request is one type of message defied by the ATT Protocol and is used to request the server to write the value of an attribute as defined by the BLE Specification. In the case that the Write Request is valid, the server can access the Characteristic Value corresponding to the Characteristic Value Handle to write the data. In the case that the data is written, the server transmits a Write Response to the client. In the case that the data fails to be written, the server transmits an error message to the client. The client may request data writing by using a Write Command which is not accompanied by a response message, instead of the Write Request. The Write Command is also one type of message defied by the ATT Protocol and is used to request the server to write the value of an attribute as defined by the BLE Specification. In the case of using the Write Command, the client cannot immediately check whether or not the writing has been performed successfully, but the server does not consume power to send a response message. Therefore, in the case that the server is a device with a small battery capacity (for example, a watch-type wearable device), the Write Command is more advantageous in terms of reduction of power consumption than the Write Request.

In the case that the server wants to notify the client of data, it transmits to the client a Handle Value Indication with an Attribute Handle Parameter and an Attribute Value parameter set to the Characteristic Value Handle of the Characteristic Value which is the date to be notified and the data, respectively. The Handle Value Indication is used for indication of an attribute's value by the server, as defined by the BLE Specification. In the case of receiving the Handle Value Indication, the client transmits a Handle Value Confirmation which is a response message to the Handle Value Indication to the server. Therefore, in the case that the importance of the data is high, it is preferable to use an Indication message. On the other hand, in the case that the importance of the data is low and reduction of power consumption of the client is important, a Handle Value Notification may be used. While the Handle Value Notification is used for notification of an attribute's value by the server, similarly to the Handle Value Indication, it is not accompanied by a Confirmation which is a response message.

The client requests data from the server, instructs the server to write data, or receive data from the server when necessary, for example, at a predetermined time or when the user performs a predetermined operation. In the case that the conventional BLE device, for example, a wearable electronic timepiece (also referred to as a "smart watch") exchanges a plurality of kinds of data with the other device, it transmits and receives each kind of data in a separate message. Therefore, in the case that the number of kinds of data to be exchanged becomes large, the number of times of transmission and reception increases by the number of kinds. This increase in the number of transactions increases power consumption and processing load. A plurality of embodiments of the present invention which will be described in the following improves the efficiency of communication by controlling transactions of data. However, the present invention is not limited to these embodiments and those skilled in the art can easily make various modifications and alternatives from the descriptions of the present invention.

FIG. 7 shows an example of an Attribute Database according to an embodiment of the present invention. The typical Attribute Database shown in FIG. 5 contains the x characteristics corresponding to the x features of Watch Feature Service and stores each of the Characteristic Values of the characteristics as the attribute's value. The Attribute Database according to the present embodiment contains three characteristics, i.e. Updated ATT_MTU, Request Command for Features, and Watch Features, regardless of the number of features.

The Updated ATT_MTU is a characteristic for notifying the smart phone 200 which is the second device of ATT_MTU updated by an MTU size exchange procedure between the electronic timepiece 100 which is the first device and the smart phone 200. The MTU represents a data capacity (size) which can be communicated per unit communication. According to the BLE Specification, the ATT_MTU is defined as the maximum size of any packet sent between a client and a server. Exchange MTU is a sub-procedure of Server Configuration used by the client to set the ATT_MTU to the maximum possible value that can be supported by both devices. An Exchange MTU Request is used by the client to inform the server of the client's maximum receive MTU size and request the server to respond with its maximum receive MTU size. In the case of receiving the Exchange MTU Request, the server sends an Exchange MTU Response in reply to the received Exchange MTU Request. The Exchange MTU Response is used by the server to inform the client of the server's maximum receive MTU size. The client and the server perform subsequent communication using the minimum value of the MTU sizes exchanged.

Conventionally, an HCI (Host Controller Interface) command for acquiring the ATT_MTU size from a built-in BLE chip is provided in a BLE communication device. However, smart phones do not have an API for using it. Thus, in the present embodiment, the electronic timepiece connected to the smart phone informs the smart phone of the ATT_MTU size updated by the Exchange MTU so that the processor of the smart phone which is the client (for example, 206 in FIG. 2B) can use the ATT_MTU size. The Updated ATT_MTU is a characteristic for informing the smart phone of the updated ATT_MTU size.

The Request Command for Features is a characteristic for writing an instruction command for designating a format in which the electronic timepiece 100 transmits and receiving data. The Watch Features is a characteristic for reading and writing setting values of the features which are setting data of the electronic timepiece 100. In the present embodiment, the setting values of the x features corresponding to the conventional characteristics (i.e. ServiceN1 to SeviceNx of FIG. 5) are stored as Attribute Value of the Watch Features. Since only one handle (0x0017) is allocated to ServiceN1 value to ServiceNx value, distinguishing information for distinguishing a plurality of kinds of data is additionally used. In other words, a plurality of kinds of setting data, which have been distinguished by the UUIDs or the handle values conventionally, are distinguished by the distinguishing information.

One example of the distinguishing information is shown in FIG. 8. In the example, the value of one piece of distinguishing information has a size of one (1) byte. More specifically, the value $(N-1)_{16}$ is allocated to the setting data of FeatureN corresponding to ServiceN as the distinguishing information. Thus, the value of the distinguishing information allocated to the setting data of Feature1 corresponding to ServiceN1 is 0x00. In the present embodiment, 0xFF, which is the maximum value of the one byte size, is used as information indicating designation of separation. The designation of separation will be described later. Therefore, a total of 255 kinds of data can be distinguished by the distinguishing information. It is preferable to manage the distinguishing information as the specification so that each of the communication device holds the same distinguishing information.

As shown in FIG. 7, the distinguishing information of the setting data of a feature corresponding to each of ServiceN1 value to ServiceNx value is stored in the first one byte of the area allocated to store the setting data of the feature, and the actual setting data is stored in the remaining area. The position at which the distinguishing information is stored is not limited to the head of the data storage area.

Figure 9:
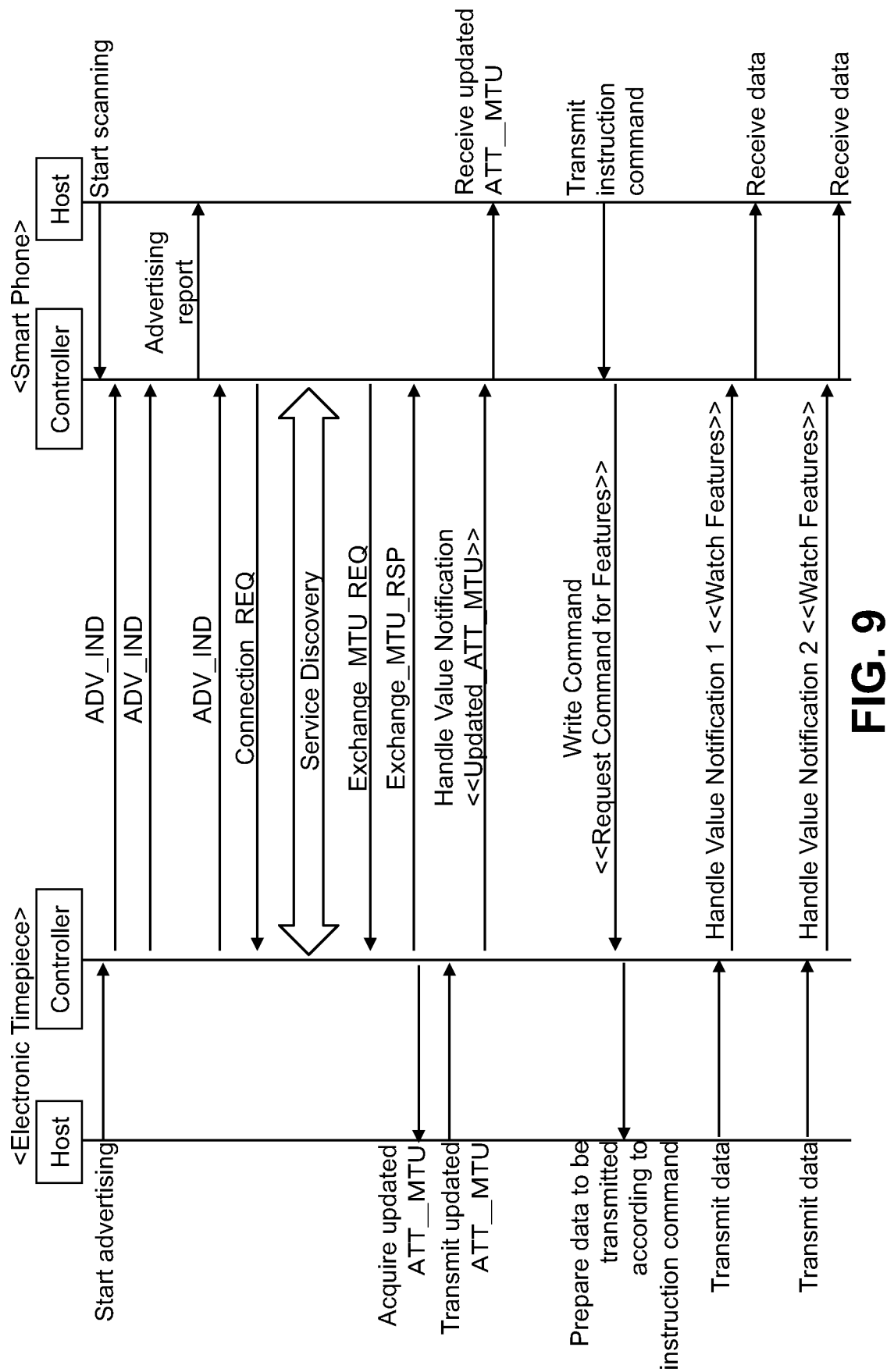
FIG. 9 is a sequence diagram showing a method by which a smart phone instructs an electronic timepiece to transmit data according to an embodiment of the present invention.

FIG. 9 is a sequence diagram showing a method by which the smart phone 200 instructs the electronic timepiece 100 to transmit data according to an embodiment of the present invention. In the present embodiment, the Attribute Database shown in FIG. 7 is implemented in the electronic timepiece 100. The electronic timepiece 100 operates as the server and the smart phone 200 operates as the client. The electronic timepiece 100 starts advertising when a predetermined condition is satisfied (for example, at a predetermined point in time or when a predetermined button is manipulated). In the present embodiment, the type of the advertising packet transmitted by the electronic timepiece 100 is ADV_IND. In order to indicate that the electronic timepiece 100 contains the Watch Feature Service, AdvData of the advertising packet includes AD Structure consisting of AD Type set to a value indicating Complete List of 128-bit Service Class UUIDs and AD Data set to a 128-bit UUID indicating the Watch Feature Service. The smart phone 200 starts scanning periodically or when a predetermined condition is satisfied (for example, at a predetermined point in time or when a predetermined button is manipulated).

In the case that the host of the smart phone 200 receives an advertising report from the controller of the smart phone 200 and a connection with the electronic timepiece 100 is required, the smart phone 200 sends a Connection Request. The two devices are physically connected by receiving at the electronic timepiece the Connection Request. As defined in the BLE Specification, the Connection Request is a packet transmitted by a master device to a slave device to create an L2CAP channel between the two devices. Then, service discovery is performed between the two devices. In a service discovery session, the smart phone 200 acquires the attribute handles of the characteristics contained in the Watch Feature Service which is the service of the electronic timepiece 100.

Then, the electronic timepiece 100 and the smart phone 200 exchange the MTU size supported by each of the devices. More specifically, the smart phone 200 which is the client sends the Exchange MTU Request to inform the electronic timepiece 100 which is the server of the client's maximum receive MTU size and request the server to respond with its maximum receive MTU size. In the case of receiving the Exchange MTU Request, the electronic timepiece 100 sends the Exchange MTU Response to inform the client of the server's maximum receive MTU size. The electronic timepiece 100 acquires the minimum value of the MTU sizes of the devices as the updated ATT_MTU and stores it as Attribute Value of the Update ATT_MTU of FIG. 7. The electronic timepiece 100 informs the smart phone 200 of the updated ATT_MTU by a Notification message. The smart phone 200 can acquire the updated ATT_MTU by receiving the Notification message.

The smart phone 200 determines, from the lengths of a plurality of kinds of setting data to be acquired from the electronic timepiece 100, a structure type including an order of the plurality of kinds of setting data, one or more combinations, and/or one or more separations so that one or more kinds of setting data can be accommodated in the acquired ATT_MTU (the updated ATT_MTU). The separation distinguishes between one more kinds of data to be communicated in one packet and other one or more kinds of setting data to be communicated in another packet. In the present embodiment, the separation is designated so that the total length of data stored in one packet is, for example, equal to or less than [(the updated ATT_MTU)−3]. According to the structure type, the format of data to be requested is determined. The smart phone 200 generates a message to request the electronic timepiece 100 to send the setting data and inform the electronic timepiece 100 of the data format of the requested setting data. Since one handle is allocated to setting values of a plurality of features as described above and a Read Request has only an Attribute Handle as its parameter, the Read Request cannot be used to request an attribute value from the electronic timepiece 100, which is a server, in the present embodiment. Thus, in the present embodiment, the smart phone 200 uses a Write Command in order to request the setting data. More specifically, the smart phone 200 generates a Write Command with an Attribute Handle parameter and an Attribute Value parameter set to the Characteristic Value Handle of the Request Command for Features (0x0017) and the data format, respectively, as the message. In the case of receiving the Write Command, the electronic timepiece 100 writes the data format as the Characteristic Value of the Request Command for Features which is the characteristic. Hereinafter, this message is referred to as the "instruction command" to distinguish it from the command for requesting the server to write a setting value of a feature.

As shown in FIG. 10, the Attribute Value parameter of the Write Command (which is the instruction command) is comprised of a command type of one byte and command data following the command type. The command type is information used to control communication with the receiver of the instruction command and indicates the direction of exchange of data. An example of the command type is shown in FIG. 11. According to this example, in the case that the smart phone 200 instructs the electronic timepiece 100 to send the setting value of a feature (i.e. the instruction command is for transmission instruction), the command type is set to 0x00. In the case that the smart phone 200 instructs the electronic timepiece 100 to wait to write the setting value of a feature (i.e. the instruction command is for write waiting instruction), the command type is set to 0x01. Thus, in the case that the smart phone 200 requests the setting data from the electronic timepiece 100 (FIG. 9), the command type of the Write Command is set to 0x00. The command data indicates the data format determined based on the acquired ATT_MTU size and lists the distinguishing information. Based on the order of array of the distinguishing information and the separation designation of the command data, the electronic timepiece 100 transmits and receives the setting data.

An example of the Attribute Value of the Write Command which is the instruction command for transmission instruction is shown in FIG. 12A. As described above, the command type is set to 0x00 indicating the transmission instruction. The command data instructs to transmit four kinds of data, i.e. from Setting for Feature 1 to Setting for Feature 4, and to combine the setting value of Feature 1 and the setting value of Feature 2 and transmit the setting values in the first message, and to combine the setting value of Feature 3 and the setting value of Feature 4 and transmit the setting values in the second message. In other words, the smart phone 200 instructs the electronic timepiece 100 to collect two of the four kinds of data such that the two kinds of data can be accommodated in the updated ATT_MTU and transmit them in two messages by notifying the electronic timepiece 100 of the data format. In the present embodiment, the data format is determined such that the total length of data stored in one packet is equal to or less than [(the updated ATT_MTU)−3], for example. The data format is preferably determined to make the most use of the ATT_MTU size. More specifically, it is desirable to determine the data format such that the maximum number of kinds of data within the ATT_MTU size are included in one message.

In the case of receiving the instruction command, the electronic timepiece 100 determines whether to transmit data or wait for an instruction of write from the smart phone 200 according to the command type. In the example of FIG. 12A, since the command type is set to 0x00, the electronic timepiece 100 generates two messages, i.e. Handle Value Notification 1 and Handle Value Notification 2, to transmit Setting for Feature 1 to Setting for Feature 4 according to the data format which is the command data of the instruction command. An Attribute Handle parameter and an Attribute Value parameter of the Handle Value Notification are set to the Characteristic Value Handle of the Watch Features (0x0017) and the setting data to be transmitted to the smart phone 200, respectively. An example of the Attribute Value of the Handle Value Notification 1 and the Handle Value Notification 2 is shown in FIG. 12B. According to the data format received from the smart phone 200, Setting for Feature 1 and Setting for Feature 2 are stored in the Attribute Value parameter of the Handle Value Notification 1 in this order and Setting for Feature 3 and Setting for Feature 4 are stored in the Attribute Value parameter of the Handle Value Notification 2 in this order.

In the case of receiving the two Notifications, the smart phone 200 analyzes the data stored in each of the Notifications as the two kinds of data combined in the order designated by the instruction command and acquires the setting values of the four features. Here, the setting data of each of Feature 1 to Feature 4 may have a different length. In this case, it is preferable that the data length of each kind of setting data is stored in each of the electronic timepiece 100 and the smart phone 200 in order to facilitate analysis of the data. Thus, the smart phone 200 can analyze the messages received from the electronic timepiece 100 based on the data format and the data length. Further, while the Handle Value Notification is used to transmit the updated ATT_MTU and the setting data in the example shown in FIG. 9, a Handle Value Indication may be used instead of the Handle Value Notification. In the case of receiving the Handle Value Indication, the smart phone 200 sends a Handle Value Confirmation in reply to the Handle Value Indication. In specific, in the case that Handle Value Indications are used to transmit the setting data, the electronic timepiece 100 may transmit the second Handle Value Indication to the smart phone 200 after the electronic timepiece 100 receives a Handle Value Confirmation in reply to the first Handle Value Indication. Similarly, the Write Command, which is the instruction command, may be replaced by a Write Request. In this case, the electronic timepiece 100 sends a Write Response in reply to the Write Request received from the smart phone 200.

Figure 13:
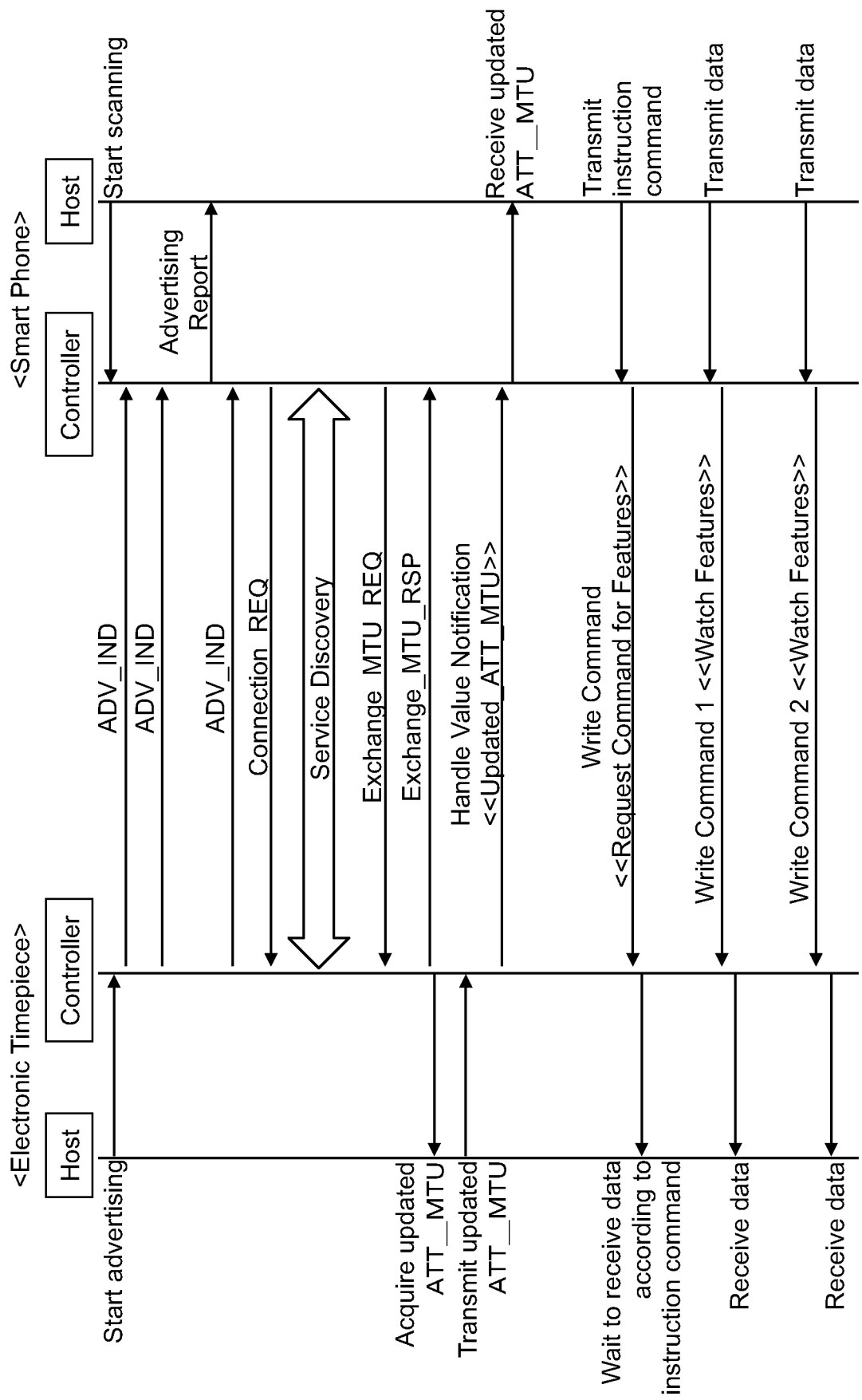
FIG. 13 is a sequence diagram showing a method by which a smart phone instructs an electronic timepiece to write data according to an embodiment of the present invention.

FIG. 13 is a sequence diagram showing a method by which the smart phone 200 instructs the electronic timepiece 100 to write data according to an embodiment of the present invention. In the present embodiment, the Attribute Database of FIG. 7 is implemented in the electronic timepiece 100. The electronic timepiece 100 operates as the server and the smart phone 200 operates as the client. The same procedures of FIG. 13 as those of FIG. 9 are not described in detail. The electronic timepiece 100 starts advertising when a predetermined condition is satisfied. The electronic timepiece 100 sends ADV_IND type advertising packets. And, the smart phone 200 starts scanning.

In the case that a connection with the electronic timepiece 100 is required, the smart phone 200 sends a Connection Request. The two devices are physically connected by receiving at the electronic timepiece 100 the Connection Request. Then, the service discovery is performed between the two devices. The electronic timepiece 100 and the smart phone 200 perform the MTU size exchange and the electronic timepiece 100 acquires the minimum value of the MTU sizes of the devices as the updated ATT_MTU. The electronic timepiece 100 informs the smart phone 200 of the updated ATT_MTU as the Attribute Value of the Update ATT_MTU by a Notification message.

The smart phone 200 determines, from the lengths of a plurality of kinds of setting data to be written in the electronic timepiece 100, the structure type including an order of the plurality of kinds of setting data, one or more combinations, and/or one or more separations so that one or more kinds of setting data can be accommodated in the acquired ATT_MTU. According to the structure type, the format of data to be written is determined. The smart phone 200 generates an instruction command to instruct the electronic timepiece 100 to wait for writing the setting data and inform the electronic timepiece 100 of the data format of the setting data to be written. The instruction command is a Write Command with the Attribute Handle parameter and the Attribute Value parameter set to the Characteristic Value Handle of the Request Command for Features (0x0015) and the data format, respectively. In the case of receiving the Write Command, the electronic timepiece 100 writes the data format as the Characteristic Value of the Request Command for Features which is the characteristic.

FIG. 14A shows an example of the Attribute Value of the Write Command which is the instruction command for write waiting instruction. As described above, the command type of one (1) byte is set to 0x01 indicating the write waiting instruction. The command data indicating the data format determined according to the ATT_MTU size informs the electronic timepiece 100 that four kinds of data, i.e. Setting for Feature 1 to Setting for Feature 4, will be transmitted in two messages. More specifically, the command data informs the electronic timepiece 100 that the setting value of Feature 1 and the setting value of Feature 2 are stored in the first message and the setting value of Feature 3 and the setting value of Feature 4 are stored in the second message. It is desirable to determine the data format so as to make the most use of the ATT_MTU size.

In the case of receiving the instruction command, the electronic timepiece 100 waits for instruction of write from the smart phone 200 according to the command type (i.e. because the command type is set to 0x01). Further, according to the data format which is the command data of the instruction command, the electronic timepiece 100 analyzes one or more messages received from the smart phone 200.

The smart phone 200 generates two messages, i.e. Write Command 1 and Write Command 2, to instruct the electronic timepiece 100 to write Setting for Feature 1 to Setting for Feature 4, according to the data format. The Attribute Handle parameter and the Attribute Value parameter of the Write Command are set to the Characteristic Value Handle of the Watch Features (0x0017) and the setting data to be written, respectively. An example of the Attribute Value of the Write Command 1 and the Write Command 2 is shown in FIG. 14B. Setting for Feature 1 and Setting for Feature 2 are stored in the Attribute Value parameter of the Write Command 1 in this order and Setting for Feature 3 and Setting for Feature 4 are stored in the Attribute Value parameter of the Write Command 2 in this order.

In the case of receiving the Write Command 1 and the Write Command 2 from the smart phone 200, the electronic timepiece 100 analyzes the received messages according to the data format acquired from the instruction command. More specifically, the electronic timepiece 100 analyzes the Write Command 1 and writes the two kinds of data stored in the Attribute Value of this message as the setting values of Feature 1 and Feature 2 (see FIG. 7). In other words, the electronic timepiece 100 updates the setting values of Feature 1 and Feature 2 to the two kinds of data stored in the Attribute Value of the Write Command 1. Further, the electronic timepiece 100 analyzes the Write Command 2 and writes the two kinds of data stored in the Attribute Value of this message as the setting values of Feature 3 and Feature 4. In other words, the electronic timepiece 100 updates the setting values of Feature 3 and Feature 4 to the two kinds of data stored in the Attribute Value of the Write Command 2. The data can be stored in a memory of the electronic timepiece 100 (for example, the memory 108). The data stored in the memory is allocated memory addresses in accordance with the array of the distinguishing information.

The setting data of each of Feature 1 to Feature 4 may have a different length. In this case, it is preferable that the data length of each kind of setting data is stored in each of the electronic timepiece 100 and the smart phone 200 in order to facilitate analysis of the data. Thus, the electronic timepiece 100 can analyze the messages received from the smart phone 200 based on the data format and the data length. While the Handle Value Notification is used to transmit the updated ATT_MTU in the example shown in FIG. 13, a Handle Value Indication may be used instead of the Handle Value Notification. Further, the Write Command may be replaced by a Write Request.

Figure 15:
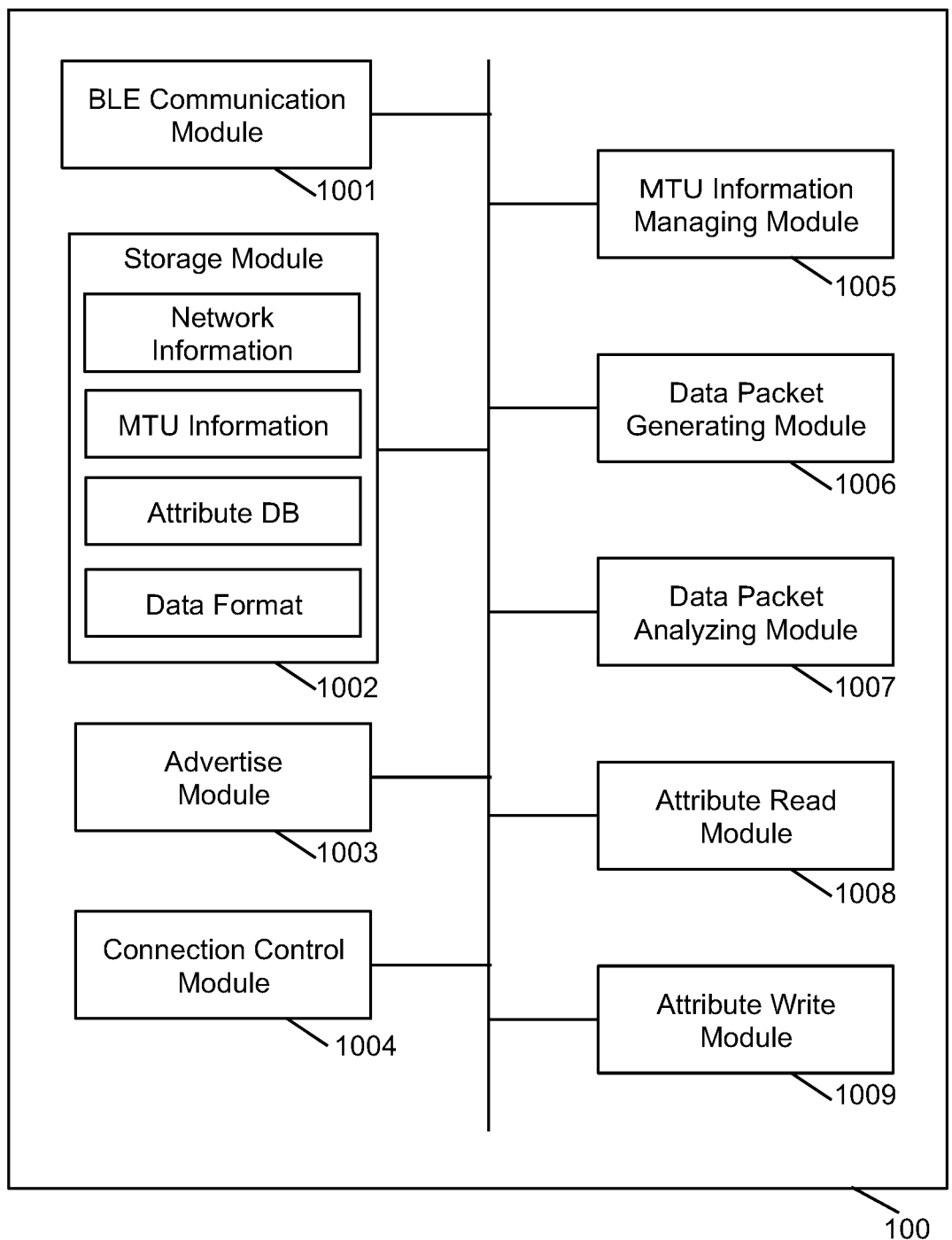
FIG. 15 is a functional block diagram of an electronic timepiece according to an embodiment of the present invention.

FIG. 15 is a functional block diagram of the electronic timepiece 100 according to an embodiment of the present invention. The electronic timepiece 100 includes a BLE communication module 1001, a storage module 1002, an advertise module 1003, a connection control module 1004, an MTU information managing module 1005, a data packet generating module 1006, a data packet analyzing module 1007, an attribute read module 1008, and an attribute write module 1009. The modules 1001 to 1009 are interconnected by a bus. The modules 1001 to 1009 are configured by software, hardware, or a combination thereof. For example, at least a part of the modules may be implemented as a Field Programmable Gate Array (FPGA).

The BLE communication module 1001 performs BLE communication with other device (for example, the smart phone 200), and can transmit/receive signals to/from the other device. The storage module 1002 stores network information used by the BLE communication module 1001, MTU information, the Attribute Database, the data format, or the like, therein. For example, the storage module 1002 includes one or more memories. In the case that the lengths of the setting values of the plurality of features stored in the Attribute Database are different, it is preferable to store the length of the setting value of each feature in the storage module 1002.

The advertise module 1003 generates advertising packets and performs advertising by sending the generated advertising packets. The advertise module 1003 starts advertising when a predetermined condition is satisfied. The connection control module 1004 establishes a connection with other device in the case that the Connection Request is received from the other device, or generates a Disconnect Request and transmits it to the other device to disconnect the connection established with the other device.

The MTU information managing module 1005 acquires the updated ATT_MTU by the Exchange MTU performed with the other device and stores it as the Characteristic Value of the Updated ATT_MTU which is the characteristic of the Attribute Database stored in the storage module 1002. The updated ATT_MTU is delivered to the data packet generating module 1006 and informed to the other device by a notification message.

The data packet generating module 1006 generates a data packet to be transmitted to the other device after the connection between the electronic timepiece 100 and the other device is established. In particular, based on the data format acquired from the instruction command for transmission instruction received from the other device, the data packet generating module 1006 generates one or more messages to transmit to the other device (the Handle Value Notification 1 and the Handle Value Notification 2 in the example of FIG. 9). The data packet analyzing module 1007 analyzes a data packet received from the other device. More specifically, the data packet analyzing module 1007 determines the PDU type of a received data packet and extracts data stored in the packet. In particular, based on the data format acquired from the instruction command for write waiting instruction received from the other device, the data packet analyzing module 1007 analyzes the data contained in one or more messages received from the other device (the Write Command 1 and the Write Command 2 in the example of FIG. 13).

The attribute read module 1008 reads an attribute value of the Attribute Database stored in the storage module 1002. In particular, in the case of receiving the instruction command for transmission instruction from the other device, the attribute read module 1008 reads the setting value of a feature requested by the other device from the Attribute Value of the Watch Features of the Attribute Database (see FIG. 7). The attribute write module 1009 writes an attribute value in the Attribute Database stored in the storage module 1002. In particular, in the case of receiving the instruction command for write waiting instruction from the other device, the attribute write module 1009 writes data received from the other device following the instruction command in the Attribute Value of the Watch Features of the Attribute Database. By this, the setting value of the corresponding feature stored in the Attribute Database is updated to the received data.

Figure 16:
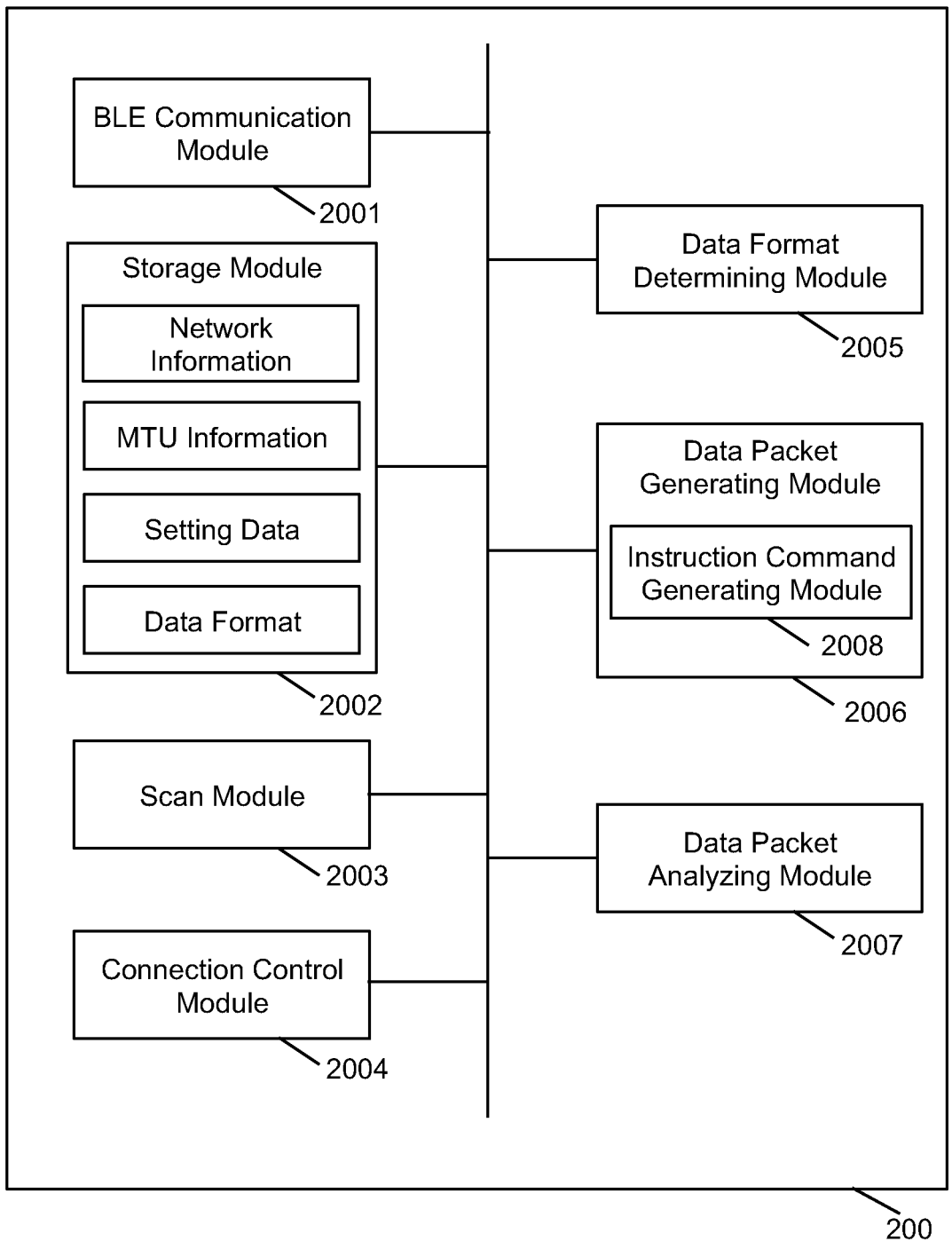
FIG. 16 is a functional block diagram of a smart phone according to an embodiment of the present invention.

FIG. 16 is a functional block diagram of the smart phone 200 according to an embodiment of the present invention. The smart phone 200 includes a BLE communication module 2001, a storage module 2002, a scan module 2003, a connection control module 2004, a data format determining module 2005, a data packet generating module 2006, and a data packet analyzing module 2007. The data packet generating module 2006 includes an instruction command generating module 2008. The modules 2001 to 2008 are interconnected by a bus. The modules 2001 to 2008 are configured by software, hardware, or a combination thereof. For example, at least a part of the modules may be implemented as the FPGA.

The BLE communication module 2001 performs BLE communication with other device (for example, the electronic timepiece 100), and can transmit/receive signals to/from the other device. The storage module 2002 stores network information used by the BLE communication module 2001, MTU information, the setting data, the data format, or the like, therein. The MTU information includes the updated ATT_MTU. In the above embodiment, the other device informs the smart phone 200 of the updated ATT_MTU. For example, the storage module 2002 includes one or more memories. In the case that the lengths of the setting values of a plurality of features are different, it is preferable to store the length of the setting value of each feature in the storage module 2002.

The scan module 2003 scans an advertising packet within a predetermined time width (scan period). In the case that a predetermined condition is satisfied, the scan module 2003 starts scanning. Further, the scan module 2003 decodes the advertising packet received within the scan period to extract data stored in the advertising packet. The connection control module 2004 generates the Connection Request for requesting a connection to a proper one of devices sending advertising packets and sends it to the proper device. In the case that the Disconnect Request is received from the other device connected to the smart phone 200, the connection control module 2004 terminates the connection to the other device.

The data format determining module 2005 determines the data format based on the updated ATT_MTU stored in the storage module 2002. As shown in FIGS. 12A and 14A, the data format determining module 2005 determines, from the lengths of a plurality of kinds of setting data to be transmitted/received to/form the other device, the data format including an order of the plurality of kinds of setting data, one or more combinations, and/or one or more separations so that one or more kinds of setting data can be accommodated in the updated ATT_MTU. The determined data format is delivered to the instruction command generating module 2008 and informed to the other device by the instruction command. Based on the informed data format, the other device generates a message to be transmitted to the smart phone 200 or analyzes a message received from the smart phone 200.

After a connection is established between the smart phone 200 and the other device, the data packet generating module 2006 generates a data packet to be transmitted to the other device. The data packet generating module 2006 includes an instruction command generating module 2008. The instruction command generating module 2008 generates the instruction command for transmission instruction (for example, FIG. 12A) or the instruction command for write waiting instruction (for example, FIG. 14A). The command type (the transmission instruction or the write waiting instruction) and the command data (the data format determined by the data format determining module 2005) are stored in the Attribute Value of the instruction command.

The data packet analyzing module 2007 analyzes a data packet received from the other device. More specifically, the data packet analyzing module 2007 determines the PDU type of the data packet and extracts data stored in the packet. In particular, based on the data format stored in the storage module 2002, the data packet analyzing module 2007 analyzes data contained in one or more messages transmitted by the other device in response to the instruction command for transmission instruction.

Figure 17:
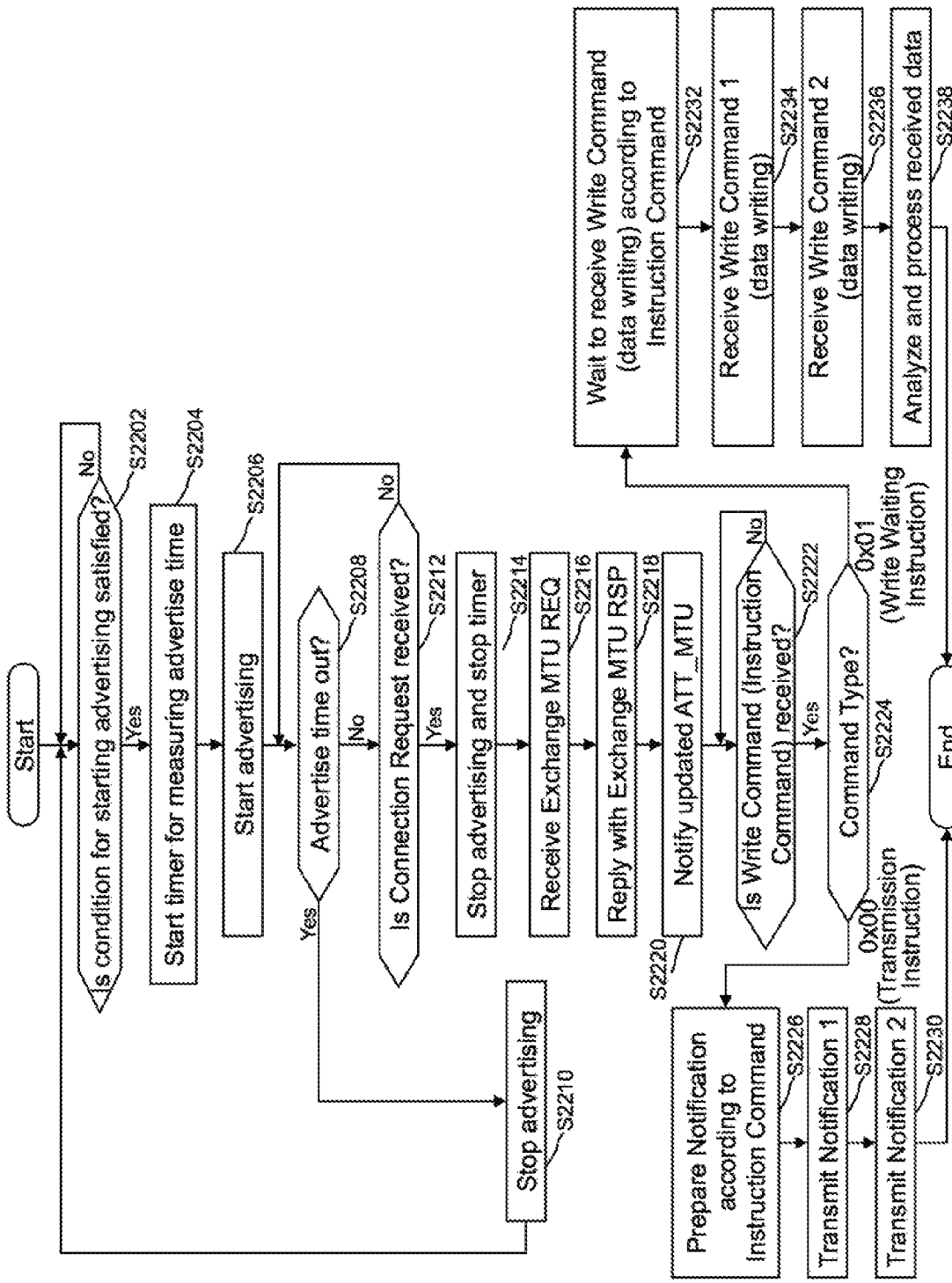
FIG. 17 is a flow chart showing an algorithm for implementing a communication process of an electronic timepiece according to an embodiment of the present invention.

FIG. 17 is a flow chart showing an algorithm for implementing a communication process of the electronic timepiece 100 according to an embodiment of the present invention. In the present embodiment, the Attribute Database of FIG. 7 is implemented in the electronic timepiece 100. The electronic timepiece 100 operates as the server and the smart phone 200 operates as the client. In the following, FIG. 17 will be described in detail with reference to FIGS. 9 to 14.

The electronic timepiece 100 determines whether or not a predetermined condition for starting advertising is satisfied (Step S2202). For example, the predetermined condition is whether or not it is a predetermined point in time or whether or not a predetermined button is manipulated. In the case that the predetermined condition is not satisfied (Step S2202: No), the electronic timepiece 100 does not start advertising. In the case that the predetermined condition is satisfied (Step S2202: Yes), the electronic timepiece 100 starts a timer for counting advertise time (Step S2204) and starts advertising (Step S2206).

Then, the electronic timepiece 100 determines whether or not the timer reaches a predetermined time value Ta (an advertise time width) (Step S2208). In the case that the timer does not reach Ta, i.e. a time-out does not occur (Step S2208: No), the process moves to Step S2212. In the case that the timer reaches Ta, i.e. the time-out occurs (Step S2208: Yes), the electronic timepiece 100 stops advertising (Step S2210) and the process returns to Step S2202. At Step S2212, the electronic timepiece 100 determines whether or not the Connection Request is received from the smart phone 200. In the case that the Connection Request is not received (Step S2212: No), the process returns to Step S2208. In the case that the Connection Request is received (Step S2212: Yes), the electronic timepiece 100 stops advertising and the time count of the timer (Step S2214). In FIG. 17, the process of service discovery is omitted.

The electronic timepiece 100 receives the Exchange MTU Request from the smart phone 200 for informing the electronic timepiece 100 of its maximum receive MTU size (Step S2216). In reply to the Exchange MTU Request, the electronic timepiece 100 sends the Exchange MTU Response for informing the smart phone 200 of its maximum receive MTU size to the smart phone 200 (Step S2218). The electronic timepiece 100 acquires the minimum value of the MTU sizes of the devices as the updated ATT_MTU and notifies the smart phone 200 of the updated ATT_MTU (Step S2220). More specifically, the electronic timepiece 100 stores the updated ATT_MTU as the Attribute Value of the Update ATT_MTU of the Attribute Database and informs the smart phone 200 of the Attribute Value by a Notification message.

The electronic timepiece 100 determines whether or not a Write Command with the Attribute Handle parameter set to the Characteristic Value Handle of the Request Command for Features is received (Step S2222). In the case of receiving the Write Command (Step S2222: Yes), the electronic timepiece 100 determines that this message is the instruction command. Further, the electronic timepiece 100 stores the command type and the data format which is the command data stored in the Attribute Value of the message as the Characteristic Value of the Request Command for Features of the Attribute Database. The electronic timepiece 100 checks the command type (Step S2224), and the process moves to Step S2226 in the case that the command type is 0x00 (transmission instruction) and moves to Step S2232 in the case that the command type is 0x01 (write waiting instruction).

In the case that the command type is 0x00, the electronic timepiece 100 prepares a message for notifying the setting value of a feature requested by the smart phone 200 according to the instruction command (transmission instruction) (Step S2226). More specifically, the electronic timepiece 100 generates the required number of Notification messages based on the order of data, the combination(s), the separation(s), or the like, of the data format acquired from the instruction command. In the example shown in FIGS. 12A and 12B, the Handle Value Notification 1 containing the setting values of Feature 1 and Feature 2 is generated and transmitted to the smart phone 200 (Step S2228) and the Handle Value Notification 2 containing the setting values of Feature 3 and Feature 4 is generated and transmitted to the smart phone 200 (Step S2230). Thereby, the process ends.

In the case that the command type is 0x01, the electronic timepiece 100 waits to receive a Write Command for instructing the electronic timepiece 100 to write data according to the instruction command (write waiting instruction) (Step S2232). In the example shown in FIGS. 14A and 14B, the electronic timepiece 100 receives the Write Command 1 containing the setting values of Feature 1 and Feature 2 which the smart phone 200 wants to write (Step S2234) and receives the Write Command 2 containing the setting values of Feature 3 and Feature 4 which the smart phone 200 wants to write (Step S2236). The electronic timepiece 100 analyzes the data of the Write Command 1 and the Write Command 2 received from the smart phone 200 based on the order of data, the combinations, the separations, or the like, of the data format acquired from the instruction command, and writes the setting values of Feature 1 to Feature 4 (Step S2238). Thereby, the process ends.

Figure 18:
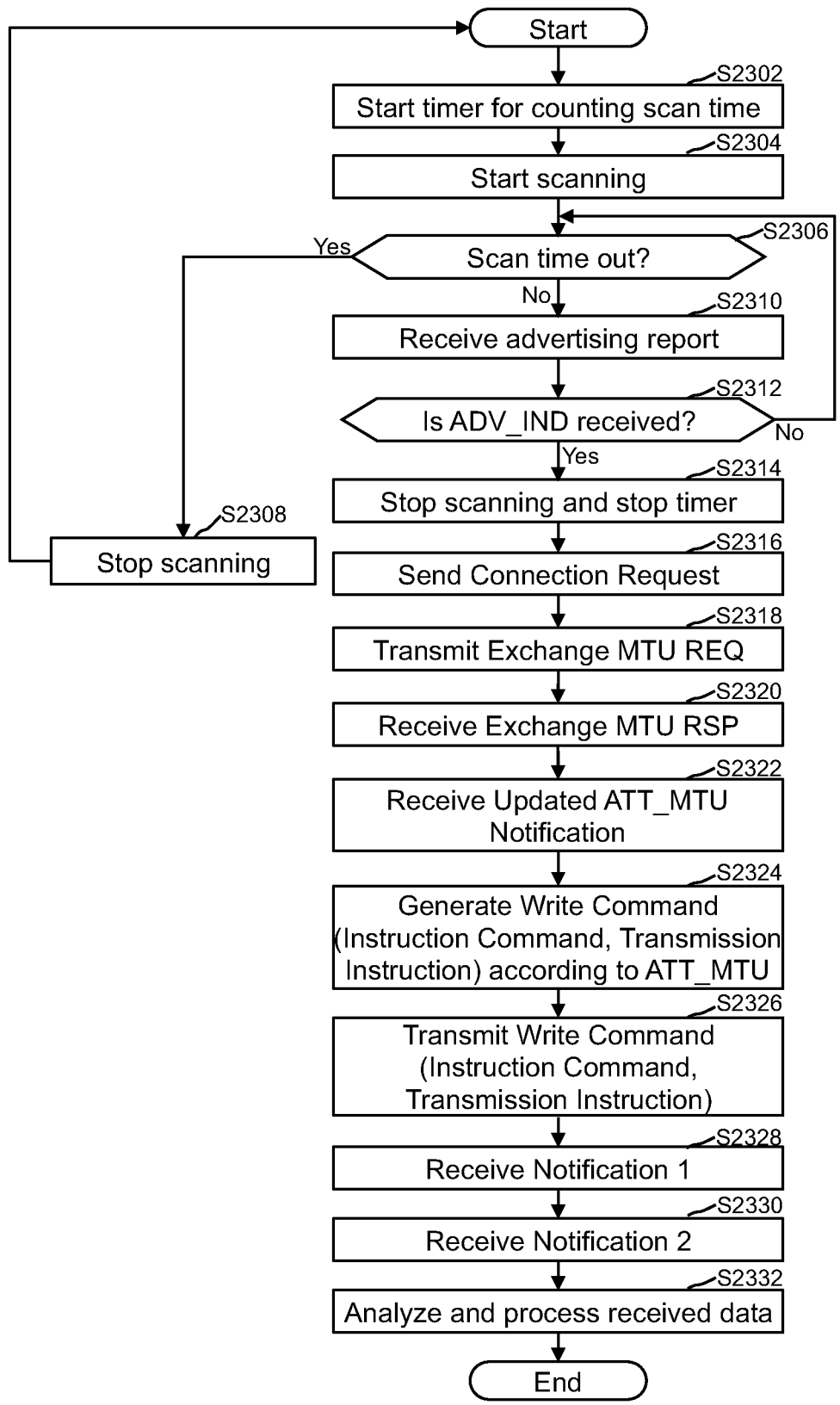
FIG. 18 is a flow chart showing an algorithm for implementing a communication process of a smart phone for instructing an electronic timepiece to transmit data according to an embodiment of the present invention.
Figure 19:
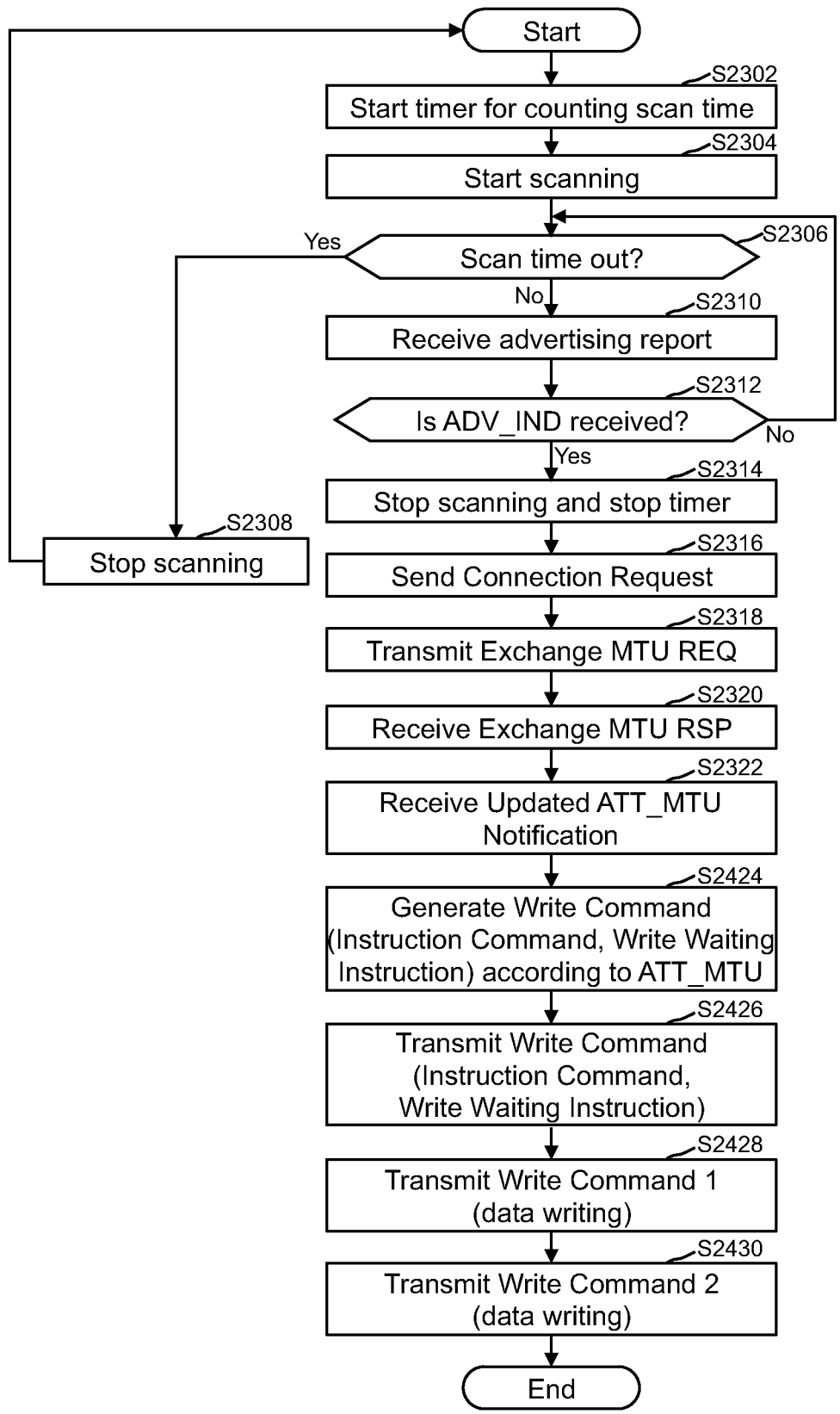
FIG. 19 is a flow chart showing an algorithm for implementing a communication process of a smart phone for instructing an electronic timepiece to write data according to an embodiment of the present invention.

Each of FIGS. 18 and 19 is a flow chart showing an algorithm for implementing a communication process of the smart phone 200 according to an embodiment of the present invention. FIG. 18 is a flow chart showing an algorithm for implementing a communication process of the smart phone 200 for instructing the electronic timepiece 100 to transmit data according to an embodiment of the present invention. In the following, FIG. 18 will be described in detail with reference to FIGS. 9 to 12. The smart phone 200 starts a timer for counting scan time (Step S2302) and starts scanning (Step S2304). As described above, the smart phone 200 performs scanning periodically or when a predetermined condition is satisfied (for example, at a predetermined point in time or when a predetermined button is manipulated).

The smart phone 200 determines whether or not the timer reaches a predetermined time value Ts (a scan time width) (Step S2306). In the case that the timer does not reach Ts, i.e. a time-out does not occur (Step S2306: No), the process moves to Step S2310. In the case that the timer reaches Ts, i.e. the time-out occurs (Step S2306: Yes), the smart phone 200 stops scanning (Step S2308). At Step S2310, the host of the smart phone 200 receives the advertising report from the controller. Then, the smart phone 200 determines whether or not an advertising packet of ADV_IND type is received from the electronic timepiece 100 (Step S2312). In the case that the ADV_IND type advertising packet is not received (Step S2312: No), the process returns to Step S2306. In the case that the ADV_IND type advertising packet is received (Step S2312: Yes), the smart phone 200 stops scanning and the time count of the timer (Step S2314). Then, the smart phone 200 sends the Connection Request to the electronic timepiece 100 (Step S2316). In FIG. 18, the process of service discovery is omitted.

In the case that the connection between the two devices is established by the above procedures, the smart phone 200 sends the Exchange MTU Request to inform the electronic timepiece 100 of its maximum receive MTU size (Step S2318) and receives the Exchange MTU Response to inform the smart phone 200 of the maximum receive MTU size of the electronic timepiece 100 (Step S2320). Then, the smart phone 200 receives a Notification message with the Attribute Value parameter set to the updated ATT_MTU (i.e. the Characteristic Value of the Updated ATT_MTU) from the electronic timepiece 100 (Step S2322).

Based on the ATT_MTU acquired from the received Notification message, the smart phone 200 generates the Write Command which is the instruction command for transmission instruction (Step S2324). More specifically, the smart phone 200 determines, from the data lengths of a plurality of kinds of setting data to be acquired, the data format including an order of the plurality of kinds of setting data, one or more combinations, and/or one or more separations so that one or more kinds of setting data can be accommodated in the updated ATT_MTU. The Attribute Handle parameter and the Attribute Value parameter of the Write Command (i.e. the instruction command) are set to the Characteristic Value Handle of the Request Command for Features, and 0x00 (transmission instruction) which is the command type and the data format following the command type, respectively (see FIG. 12A). Then, the smart phone 200 transmits the Write Command to the electronic timepiece 100 (Step S2326).

The smart phone 200 receives from the electronic timepiece 100 one or more messages for informing the smart phone 200 of the setting data requested by the instruction command. In the example shown in FIGS. 12A and 12B, the smart phone 200 receives the Handle Value Notification 1 containing the setting values of Feature 1 and Feature 2 (Step S2328) and receives the Handle Value Notification 2 containing the setting values of Feature 3 and Feature 4 (Step S2330). Based on the data format, the smart phone 200 analyzes and processes the received messages (Step S2332). More specifically, the smart phone 200 analyzes the data contained in the Attribute Value of each of the received Handle Value Notifications as two kinds of data combined in the order defined in the data format and acquires the setting data of the four features to store the setting data in the memory (for example, the memory 208 of FIG. 2B). Thereby, the process ends.

FIG. 19 is a flow chart showing an algorithm for implementing a communication process of the smart phone 200 for instructing the electronic timepiece 100 to write data according to an embodiment of the present invention. In the following, FIG. 19 will be described in detail with reference to FIGS. 10 to 14. In FIGS. 18 and 19, the same reference numerals are used to indicate the same procedures, and those procedures are not described in detail with regard to FIG. 19.

The smart phone 200 generates a Write Command which is the instruction command for write waiting instruction based on the ATT_MTU acquired from the Notification message received at Step S2322 (Step S2424). More specifically, the smart phone 200 determines, from the lengths of a plurality of kinds of setting data to be written, the data format including an order of the plurality of kinds of setting data, one or more combinations, and/or one or more separations so that one or more kinds of setting data can be accommodated in the updated ATT_MTU. The Attribute Handle parameter and the Attribute Value parameter of the Write Command (which is the instruction command) are set to the Characteristic Value Handle of the Request Command for Features, and 0x01 (write waiting instruction) which is the command type and the data format following the command type (see FIG. 14A), respectively. The smart phone 200 transmits the Write Command to the electronic timepiece 100 (Step S2426).

Then, the smart phone 200 generates a Write Command for instructing the electronic timepiece 100 to write setting data and transmits it to the electronic timepiece 100. The Attribute Handle parameter and the Attribute Value parameter of the Write Command are set to the Characteristic Value Handle of the Watch Features and the setting data to be written, respectively. In the example shown in FIGS. 14A and 14B, the Write Command 1 containing the setting values of Feature 1 and Feature 2 in this order is transmitted (Step S2428) and the Write Command 2 containing the setting values of Feature 3 and Feature 4 in this order is transmitted (Step S2430). Thereby, the process ends.

The Write Command and the Handle Value Notification in FIGS. 17 to 19 may be replaced by a Write Request and a Handle Value Indication, respectively. According to the embodiment shown in FIGS. 17 to 19, the smart phone 200 which is the client transmits the instruction command to the electronic timepiece 100 which is the server to reduce the number of data transactions between the devices by collecting a plurality of kinds of data and transmitting/receiving the plurality of kinds of data in one message so as to make the most use of the MTU size. Thus, it is possible to reduce the amount of communication (the number of communication times) and suppress the power consumption.

Second Embodiment

The embodiment described above is based on the premises that the Exchange MTU must be executed at the time of connection and that the host has no means of receiving the ATT_MTU updated as a result of the Exchange MTU from the controller, due to the limitation of the smartphone 200. In the case that there is no such limitation, the Exchange MTU is executed only when necessary, as shown in FIG. 20.

Figure 20:
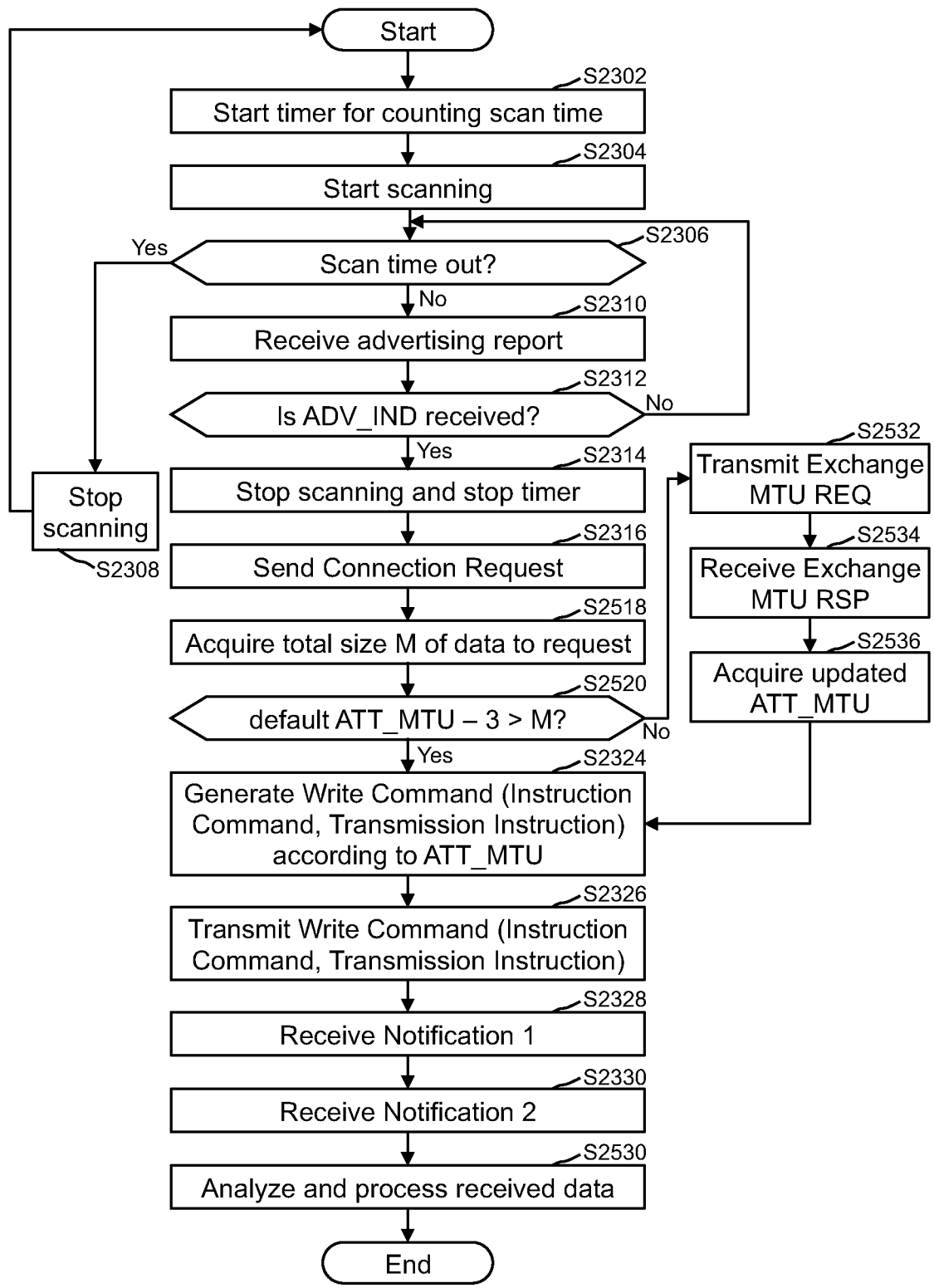
FIG. 20 is a flow chart showing an algorithm for implementing a communication process of a smart phone for instructing an electronic timepiece to transmit data according to an embodiment of the present invention.

FIG. 20 is a flow chart showing an algorithm for implementing a communication process of the smart phone 200 according to an embodiment of the present invention. FIG. 20 shows a process of the smart phone 200 for instructing the electronic timepiece 100 to transmit data. In FIGS. 18 and 20, the same reference numerals are used to indicate the same procedures, and those procedures are not described in detail with regard to FIG. 20.

In the case that a connection is established between the electronic timepiece 100 and the smart phone 200, the smart phone 200 acquires the total size M of the data to request (Step S2518). Then, the smart phone 200 determines whether or not M is accommodated in [(the default ATT_MTU)−3], i.e., 20 octets (Step S2520). In the case that M exceeds 20 octets (Step S2520: No), the process moves to Step S2532. In the case that M does not exceed 20 octets (Step S2520: Yes), the smart phone 200 generates a Write Command which is the instruction command for transmission instruction (Step S2324) and transmits it to the electronic timepiece 100 (Step S2326).

The smart phone 200 receives two Notification messages (Steps S2328, S2330). The number of the messages, i.e. the separations of the data, can be determined according to the ATT_MTU, the size M, the number of kinds of data, or the like. The smart phone 200 analyzes and processes the received messages based on the data format (Step S2530). More specifically, the smart phone 200 analyzes the data stored in the Attribute Value of each of the received Handle Value Notifications as one or more kinds of setting data combined in the order defined by the data format and acquires the setting data to store it in a memory (for example, the memory 208 of FIG. 2B). Thereby, the process ends.

On the other hand, in the case that M exceeds 20 octets (Step S2520: No), the process moves to Step S2532 and the smart phone 200 executes the Exchange MTU. The smart phone 200 sends the Exchange MTU Request to inform the electronic timepiece 100 of its maximum receive MTU size (Step S2532) and receives from the electronic timepiece 100 the Exchange MTU Response for informing the smart phone 200 of its maximum receive MTU size (Step S2534). Then, the smart phone 200 compares its maximum receive MTU size with the maximum receive MTU size of the electronic timepiece 100 to acquire the minimum value as the updated ATT_MTU (Step S2536).

According to the present embodiment, it is possible to further reduce transactions of data related to the Exchange MTU.

Third Embodiment

FIG. 21 shows an example of the Attribute Database according to another embodiment of the present invention. The Attribute Database includes the Request Command for Features which is the characteristic for writing the instruction command indicating the format in which the electronic timepiece 100 transmits/receives data. The Attribute Database according to the embodiment of FIG. 21 includes Read Command for Features, which is a characteristic for writing a format for data transmission, and Write Command for Features, which is a characteristic for writing a format for data writing. In the present embodiment, the command type described with regard to FIG. 10 is not employed. Instead of using the command type, in the case that the smart phone 200 instructs the electronic timepiece 100 to transmit the setting values of one or more features, the smart phone 200 transmits a Write Command with the Attribute Handle parameter and the Attribute Value parameter set to the Characteristic Value Handle of the Read Command for Features (0x0015) and the format of the data to be transmitted, respectively, to the electronic timepiece 100, as an instruction command for transmission instruction. In the case that the smart phone 200 instructs the electronic timepiece 100 to wait to write the setting values of one or more features, the smart phone 200 transmits a Write Command with the Attribute Handle parameter and the Attribute Value parameter set to the Characteristic Value Handle of the Write Command for Features (0x0017) and the format of the data to be written, respectively, to the electronic timepiece 100, as an instruction command for write waiting instruction.

In the case of receiving the Write Command with the Attribute Handle parameter set to the Characteristic Value Handle of the Read Command for Features, the electronic timepiece 100 determines that the Write Command is the instruction command for transmission instruction, and stores the data format which is the Attribute Value parameter of the Write Command as the Characteristic Value of the Read Command for Features. Then, the electronic timepiece 100 generates a message to transmit to the smart phone 200 based on the data format.

In the case of receiving the Write Command with the Attribute Handle parameter set to the Characteristic Value Handle of the Write Command for Features, the electronic timepiece 100 determines that the Write Command is the instruction command for write waiting instruction, and stores the data format which is the Attribute Value parameter of the Write Command as the Characteristic Value of the Write Command for Features. Then, the electronic timepiece 100 analyzes a message received from the smart phone 200 based on the data format.

According to the embodiments of the present invention, the setting values of all of the features are managed by using the integrated-type characteristics Watch Features to reduce the time required for the service discovery, thereby reducing the number of communication times. Further, it is unnecessary to add a service or a characteristic even in the case that a new feature is added. In the case that a feature specified by the specification of the current version is to be added to the server device, it is only necessary to add a piece of distinguishing information corresponding to the feature and the setting value of the feature as the attribute of the Attribute Database. In this case, the convenience of the user can be enhanced if the firmware of the device is designed such that the piece of distinguishing information can be automatically assigned according to the feature when the user is programming to add the feature. Further, the firmware may be designed such that the user can add a new function which is not specified by the current version of the specification. In this case, a new piece of distinguishing information is created to distinguish the setting value of the feature. Preferably, the newly created piece of distinguishing information has a unique value different from those assigned to setting values of different features. In addition, the user may add the piece of distinguishing information by using the website managed by the Standard Group. The specification to which the new piece of distinguishing information has been added can be applied to the communication devices by update of the firmware, or the like.

The present invention has been described with respect to specific embodiments in which it has been applied to Bluetooth, in particular BLE, but its application field is not limited to Bluetooth. For example, the invention can be applied to different wireless communication technologies. In particular, the present invention is applicable to wireless communication technologies which utilize the MTU.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A device comprising:
a memory;
a transmitter and receiver that transmits and receives communication packets to and from other device; and
a processor, wherein the processor:
receives a packet containing first information indicating a structure type of data from the other device via the transmitter and receiver; and
communicates data corresponding to the first information with the other device via the transmitter and receiver,
receives second information relating to communication control from the other device via the transmitter and receiver and controls the transmitter and receiver based on the received second information, and
generates one or more packets to be transmitted to the other device based on the first information in a case that the second information has a first value,
wherein the transmitter and receiver wait to receive another packet from the other device in a case that the second information has a second value, wherein the memory stores a plurality of distinguishing information for distinguishing a plurality of features and a plurality of setting values of the plurality of features, and
wherein the processor:
generates a predetermined number of packets in the case that the second information has the first value, each of the predetermined number of packets contains setting values of one or more features, and
analyzes a predetermined number of packets received from the other device based on the first information in the case that the second information has the second value.

2. The device of claim 1, wherein the processor stores the data contained in the predetermined number of packets received from the other device in the memory based on the first information in the case that the second information has the second value.

3. The device of claim 1, wherein the first information includes one or a plurality of distinguishing information.

4. The device of claim 1, wherein the first information includes the plurality of distinguishing information and separation information, and the separation information distinguishes data to be communicated in one packet from data to be communicated in a different packet.

5. The device of claim 4, wherein the predetermined number of packets to be communicated with the other device is determined based on an array of the separation information and the plurality of distinguishing information in the first information.

6. The device of claim 3, wherein:
when the second information has the first value, the processor generates the predetermined number of packets in accordance with an array of the plurality of distinguishing information; and
the generated predetermined number of packets contain a setting value of the plurality of features corresponding to the plurality of distinguishing information.

7. The device of claim 3, wherein:
when the second information has the second value, the processor stores data in the memory, which data is contained in the predetermined number of packets received from the other device, as a setting value of the plurality of features corresponding to the plurality of distinguishing information; and
the data stored in the memory is allocated memory addresses in accordance with an array of the plurality of distinguishing information.

8. The device of claim 1, wherein the memory stores length information indicating length information of a setting value of each of the plurality of features.

9. The device of claim 8, wherein the processor generates the predetermined number of packets based on the first information and the length information in the case that the second information has the first value, and
each of the predetermined number of packets contains setting values of one or more features.

10. The device of claim 8, wherein the processor analyzes the predetermined number of packets received from the other device based on the first information and the length information in the case that the second information has the second value.

11. The device of claim 2, wherein the memory further stores a Maximum Transmission Unit size of the device, and the processor compares the Maximum Transmission Unit size of the device with a Maximum Transmission Unit size of the other device in the case that the Maximum Transmission Unit size of the other device is acquired via the transmitter and receiver and generates a packet containing a minimum value of the Maximum Transmission Unit sizes.

12. An electronic timepiece comprising:
the device of claim 1;
a clock circuit that counts current time; and
a display that displays the current time counted by the clock circuit.

13. A communication method performed by a device comprising:
receiving a packet containing first information indicating a structure type of data from another device extracting the first information from the packet;
communicating data corresponding to the first information;
receiving second information relating to communication control from the other device;
generating one or more packets to be transmitted to the other device based on the first information when the second information has a first value;
waiting to receive another packet from the other device when the second information has a second value;
storing a plurality of distinguishing information for distinguishing a plurality of features and a plurality of setting values of the plurality of features;
generating a predetermined number of packets when the second information has the first value, each of the predetermined number of packets containing setting values of one or more features; and
analyzing a predetermined number of packets received from the other device based on the first information when the second information has the second value.

14. A non-transitory computer-readable storage medium for storing a computer program comprising a sequence of instructions which, when executed by a computer included in a device, cause the device to perform steps of:
receiving a packet containing first information indicating a structure type of data from another device;
extracting the first information from the packet;
communicating data corresponding to the first information;
receiving second information relating to communication control from the other device;
generating one or more packets to be transmitted to the other device based on the first information when the second information has a first value;
waiting to receive another packet from the other device when the second information has a second value;
storing a plurality of distinguishing information for distinguishing a plurality of features and a plurality of setting values of the plurality of features;
generating a predetermined number of packets when the second information has the first value, each of the predetermined number of packets containing setting values of one or more features; and
analyzing a predetermined number of packets received from the other device based on the first information when the second information has the second value.

* * * * *